United States Patent
Suzuki et al.

(10) Patent No.: US 9,784,487 B2
(45) Date of Patent: Oct. 10, 2017

(54) DECOMPRESSION DEVICE HAVING FLOW CONTROL VALVES AND REFRIGERATION CYCLE WITH SAID DECOMPRESSION DEVICE

(75) Inventors: Tatsuhiro Suzuki, Kariya (JP); Etsuhisa Yamada, Kariya (JP); Haruyuki Nishijima, Obu (JP)

(73) Assignee: DENSO CORPORATION, Kariya, Aichi-pref., (JP)

( * ) Notice: Subject to any disclaimer, the term of this patent is extended or adjusted under 35 U.S.C. 154(b) by 211 days.

(21) Appl. No.: 14/007,183

(22) PCT Filed: Mar. 21, 2012

(86) PCT No.: PCT/JP2012/001917
§ 371 (c)(1),
(2), (4) Date: Sep. 24, 2013

(87) PCT Pub. No.: WO2012/132317
PCT Pub. Date: Oct. 4, 2012

(65) Prior Publication Data
US 2014/0020424 A1  Jan. 23, 2014

(30) Foreign Application Priority Data
Mar. 28, 2011  (JP) ................................ 2011-069537

(51) Int. Cl.
*F25B 1/06* (2006.01)
*F25B 41/00* (2006.01)
(Continued)

(52) U.S. Cl.
CPC ............ *F25B 41/00* (2013.01); *F25B 41/062* (2013.01); *B60H 2001/3298* (2013.01); *F25B 41/06* (2013.01); *F25B 2341/0012* (2013.01)

(58) Field of Classification Search
CPC .... F25B 1/00; F25B 2341/0012; F25B 41/00; F25B 41/06; F25B 41/062
(Continued)

(56) References Cited

U.S. PATENT DOCUMENTS 3,670,519 A * 6/1972 Newton .................... F25B 1/06
62/116
4,378,681 A * 4/1983 Modisette ................ F25B 1/06
62/116
(Continued)

FOREIGN PATENT DOCUMENTS

JP        7-332806 A    12/1995
JP        08-159617     6/1996
(Continued)

OTHER PUBLICATIONS

Office action dated Nov. 26, 2013 in corresponding Japanese Application 2011-069537.
(Continued)

*Primary Examiner* — David Teitelbaum
(74) *Attorney, Agent, or Firm* — Harness, Dickey & Pierce, P.L.C.

(57) ABSTRACT

A body part of a decompression device has a swirl space for swirling a refrigerant that flows from a refrigerant inlet, and a refrigerant outlet that is positioned on an extension line of a swirl center line of the refrigerant and functions as a throttle. Further, a passage cross-sectional area of the refrigerant inlet is configured to be smaller than a twelve-fold value of a passage cross-sectional size of the refrigerant outlet, such that a swirl speed of the refrigerant in the swirl space is increased so as to enable a decompression boiling of the refrigerant around the swirl center line. In such manner, a gas-liquid mixture phase refrigerant securely flows into the refrigerant outlet, and it restricts a fluctuation
(Continued)

of a flow amount of the refrigerant flowing toward a downstream side without complicating a cycle structure.

15 Claims, 11 Drawing Sheets

(51) Int. Cl.
*F25B 41/06* (2006.01)
*B60H 1/32* (2006.01)

(58) Field of Classification Search
USPC .................................................. 62/191, 500
See application file for complete search history.

(56) References Cited

U.S. PATENT DOCUMENTS

| | | | | |
|---|---|---|---|---|
| 4,707,278 | A | * | 11/1987 | Breyer et al. ................ 251/122 |
| 5,619,861 | A | | 4/1997 | Yamanaka et al. |
| 5,706,666 | A | | 1/1998 | Yamanaka et al. |
| 6,138,456 | A | * | 10/2000 | Garris .............................. 60/649 |
| 6,877,339 | B2 | * | 4/2005 | Nishijima et al. .............. 62/500 |
| 7,497,666 | B2 | * | 3/2009 | Garris, Jr. ....................... 417/182 |
| 2003/0213264 | A1 | * | 11/2003 | Ogata et al. .................... 62/500 |
| 2004/0244408 | A1 | * | 12/2004 | Nishijima et al. .............. 62/500 |
| 2005/0155374 | A1 | * | 7/2005 | Oshitani et al. ................ 62/500 |
| 2008/0000263 | A1 | * | 1/2008 | Oomura ................ F25B 39/028 62/525 |
| 2008/0209914 | A1 | * | 9/2008 | De Wergifosse ......... F25B 9/04 62/5 |
| 2009/0013704 | A1 | * | 1/2009 | Oshitani ................. F25B 41/00 62/191 |
| 2010/0175422 | A1 | * | 7/2010 | Yamada et al. ................. 62/512 |
| 2011/0005268 | A1 | * | 1/2011 | Oshitani et al. ................ 62/500 |

FOREIGN PATENT DOCUMENTS

| | | |
|---|---|---|
| JP | 8-159617 A | 6/1996 |
| JP | 9-159617 | 6/1997 |
| JP | 3603552 B2 | 10/2004 |
| JP | 2006-23010 A | 1/2006 |
| JP | 2008-232458 A | 10/2008 |
| JP | 2009-127920 A | 6/2009 |
| JP | 4306739 B2 | 8/2009 |
| JP | 2010-210111 A | 9/2010 |

OTHER PUBLICATIONS

Office action dated Feb. 27, 2015 in corresponding Korean Application 10-2013-7027535.
Office action dated May 27, 2014 in corresponding Japanese Application 2011-069537.
International Search Report and Written Opinion of the ISA for PCT/JP2012/001917, ISA/NP, mailed Apr. 24, 2012.
Office action dated Dec. 3, 2014 in corresponding Chinese Application 201280014959.X.

* cited by examiner (a)

(b)

DECOMPRESSION DEVICE HAVING FLOW CONTROL VALVES AND REFRIGERATION CYCLE WITH SAID DECOMPRESSION DEVICE

CROSS REFERENCE TO RELATED APPLICATION

This application is a US National Phase of PCT/JP2012/001917, which is based on and claims the benefit of priority of Japanese Patent Application No. 2011-069537 filed on Mar. 28, 2011, the disclosure of which is incorporated herein by reference.

TECHNICAL FIELD

The present disclosure generally relates to a decompression device used for a refrigeration cycle device, and a refrigeration cycle device.

BACKGROUND

Conventionally, a vapor-compression type refrigeration cycle device is known to include, as components, at least: a compressor for compressing and discharging a refrigerant; a radiator for performing heat exchange between the discharged refrigerant from the compressor and an outside air; a decompression device for decompressing the refrigerant flowing from the radiator; and an evaporator for evaporating the decompressed refrigerant from the decompression device by causing heat exchange between the refrigerant and a blowing air that is to be sent into an air-conditioning space.

In such a refrigeration cycle device, it is desirable for a refrigerant flow amount flowing out of the decompression device to have a constant value regardless of the state of the refrigerant flowing into the decompression device, when a pressure difference between two pressures of the refrigerant on an inlet side and on an outlet side of the decompression device is constant. This is because, if the refrigerant flow amount flowing out of the decompression device changes, such change of the flow amount causes a change in a refrigerant circulation amount in the refrigerant cycle, thereby resulting in a change of cooling capacity of the evaporator for cooling the blowing air.

However, when, for example, a temperature change is caused for the outside air that exchanges heat with the refrigerant at the radiator, the state of the refrigerant may be changed from a gas-liquid two-phase state to a liquid state, or from the liquid-phase to the gas-liquid two-phase state, which is a change across a saturated-gas line. Such state change of the refrigerant across the saturated-gas line causes a drastic change of a refrigerant density, thereby leading to a drastic change of the refrigerant flow amount flowing out of the decompression device in some cases.

In view of such change, a radiator (i.e., a so-called sub-cool type condenser) or similar device is well-known, which cools the refrigerant to a supercooled liquid-phase state before discharging the refrigerant toward the decompression device, for the stability of the refrigerant flow amount flowing out of the decompression device. Further, because such a sub-cool type condenser cools the refrigerant to a supercooled liquid-phase state, enthalpy of the refrigerant at a refrigerant inlet side of the evaporator is decreased, and thereby refrigeration capacity of the evaporator is increased.

Further, the patent documents 1 and 2 disclose a configuration in which gas-phase and liquid-phase refrigerant flows into a nozzle of an ejector, which serves as a decompression device. Further, in the patent document 1, the refrigerant in the gas-liquid two-phase state causes to flow into the nozzle of the ejector so as to facilitate the boiling of the refrigerant at the nozzle, so that a nozzle efficiency is improved. In this case, the nozzle efficiency is defined as an efficiency of energy conversion that converts a pressure energy at the nozzle to a kinetic energy.

However, even when the above-described sub-cool type condenser is used as a radiator, the refrigerant flowing into the decompression device may have the gas-liquid two-phase state if the cooling of the refrigerant is insufficient due to, for example, a relatively high outside temperature or the like. In other words, the stabilization of the refrigerant flow amount flowing out of the decompression device may sometimes be difficult.

In contrast, when the refrigeration cycle device is configured such that, as shown in the patent documents 1 and 2, both of the liquid-phase refrigerant and the gas-phase refrigerant flow into the nozzle, the stabilization of the refrigerant flow amount flowing out of the decompression device is always expected, since, in such refrigeration cycle device, the state of the refrigerant flowing to the decompression device is securely controlled to be in the gas-liquid two-phase state regardless of the outside temperature.

However, the structure of the refrigeration cycle device in the patent documents 1 and 2 is complicated as a whole due to a trade-off of the above configuration that necessitates dedicated refrigerant passages for allowing both of the liquid-phase refrigerant and the gas-phase refrigerant to flow into the nozzle.

PRIOR ART DOCUMENT

Patent Document (Patent document 1) Japanese patent No. 4,306,739
(Patent document 2) Japanese Patent Laid-Open No. 2010-210111

SUMMARY OF THE INVENTION

In view of the above, it is a first object of the present disclosure to provide a decompression device having a simple structure, which can prevent a fluctuation of a refrigerant flow amount flowing toward a downstream side.

Further, it is another object of the present disclosure to provide a refrigeration cycle device provided with a decompression device which can prevent a fluctuation of a refrigerant flow amount flowing toward a downstream side with a simple structure.

According to a first aspect of the present disclosure, a decompression device for a refrigeration cycle device includes a refrigerant inlet into which refrigerant flows, a refrigerant outlet from which the refrigerant after being decompressed flows out, and a body part that forms a swirl space in which the refrigerant flowing from the refrigerant inlet swirls. In the decompression device, the refrigerant outlet is configured to have a throttle in which a refrigerant passage area is decreased to decompress the refrigerant, and the swirl space is configured to cause the refrigerant to swirl at a swirl speed such that a greater amount of gas-phase refrigerant is distributed to a radial inside than to a radial outside of the swirl space relative to a swirl center line when the swirl center line in the swirl space is defined as a line connecting center points of swirling of the refrigerant.

Furthermore, the refrigerant outlet is positioned on an extension line of the swirl center line.

Thus, by the swirling of the refrigerant flowing into the swirl space from the refrigerant inlet at a swirl speed such that a greater amount of a gas-phase refrigerant is distributed to the radial inside than to the radial outside of the swirl space relative to the swirl center line and also by the positioning of the refrigerant outlet on the extension line of the swirl center line, the refrigerant in a gas-liquid mixture state having a gas-rich phase is discharged from the refrigerant outlet while being decompressed at the refrigerant outlet of the decompression device.

In other words, when the refrigerant flowing into the swirl space from the refrigerant inlet is in the gas-liquid two-phase state, the liquid-phase refrigerant having a greater density is heavily distributed to the radial outside of the swirl space relative to the swirl center line according to the effect of the centrifugal force, which results in an abundance of the gas-phase refrigerant at or around the swirl center line rather than the radial outside. Thus, the refrigerant in the gas-liquid two-phase state is discharged from the refrigerant outlet that is positioned on the extension line of the swirl center line while being decompressed at the refrigerant outlet.

Further, even when the refrigerant flowing into the swirl space from the refrigerant inlet is the liquid-phase refrigerant, a pressure of the refrigerant at or around the swirl center line is decreased to a level that enables decompression boiling of the refrigerant (i.e., that causes cavitations) due to the effect of the centrifugal force, thereby causing the gas-phase refrigerant to be heavily distributed at the radial inside around the swirl center line rather than the radial outside.

Therefore, similarly to a case where the refrigerant flowing into the swirl space from the refrigerant inlet in the gas-liquid two-phase state, the refrigerant in the gas-liquid mixture state is discharged from the refrigerant outlet while being decompressed by the refrigerant outlet. Further, the refrigerant in such gas-liquid mixture state does not only indicate the refrigerant in the gas-liquid two-phase state but also indicates the refrigerant in a supercooled liquid-phase containing bubbles.

Regardless of the state of the refrigerant flowing into the swirl space from the refrigerant inlet, the refrigerant in the gas-liquid mixture state is discharged from the refrigerant outlet. As a result, without complicating the structure of the refrigerant cycle, or, with the structure of the refrigerant cycle kept in a simple one, the decompression device is enabled to prevent the fluctuation of the flow amount of the refrigerant that is to be discharged toward the downstream side of the refrigerant.

Further, the swirl center line is not necessarily be configured as a straight line. That is, the swirl center line may be a curved line depending on the shape of the swirl space or depending on the swirl speed of the swirling refrigerant.

Further, since the swirl center is at a position where the refrigerant pressure becomes lowest, the swirl center line in the swirl space may also be represented as a line that connects lowest pressure points on cross-sectional planes that are perpendicular to a refrigerant outlet open direction.

Further, the swirl speed is a component speed of the refrigerant in a swirl direction at a position on the cross-sectional plane that is perpendicular to the swirl center line. For example, the swirl speed may be a component speed of the swirling refrigerant at a radial outermost side in the swirl direction. Therefore, the swirl speed may change depending on the cross-sectional shape of the swirl space, the size of the cross-section or the like.

According to a second aspect of the present disclosure, the swirl space may include a tapered space in which a cross-sectional area of the tapered space gradually decreases toward an open direction of the refrigerant outlet.

According to a third aspect of the present disclosure, the decompression device may further include a widening taper part connected to a downstream refrigerant side of the refrigerant outlet and having a refrigerant passage sectional area that gradually increases toward a downstream refrigerant side, and a body portion. The body portion includes a refrigerant suction port from which the refrigerant is drawn by a jet refrigerant that is jetted from the widening taper part, and a diffuser part in which a pressure of a mix refrigerant that is mixture of the jet refrigerant and the drawn refrigerant drawn from the refrigerant suction port is increased.

That is, the decompression device is formed to have a Laval nozzle shape, which is a combination of the tapered space, the refrigerant outlet and the widening taper part to change the passage cross-sectional area of the refrigerant passage, and to have the body portion. Therefore, the decompression device can be used as an ejector.

According to a fourth aspect of the present disclosure, a capillary tube may be connected to the refrigerant outlet.

Further, according to a fifth aspect of the present disclosure, when the passage cross-sectional area of the refrigerant inlet is designated as Ain and when the passage cross-sectional area of the refrigerant outlet is designated as Aout, the following expression may be satisfied.

$$1 < Ain/Aout < 12$$

Thus, the pressure of the refrigerant at or around the swirl center line is decreased to a level that causes the decompression boiling.

According to a sixth aspect of the present disclosure, the decompression device may have a swirl speed adjuster for adjusting the swirl speed.

By devising such structure, a ratio of the gas-phase in the refrigerant that is discharged from the refrigerant outlet in the gas-liquid mixture state (i.e., a quality, or an amount of bubbles) may be adjusted by using the swirl speed adjuster. Therefore, the fluctuation of the amount of the discharged refrigerant from the decompression device to a downstream side can be effectively prevented.

For example, according to a seventh aspect of the present disclosure, the swirl speed adjuster may be an inlet-side flow amount adjustment valve that adjusts the flow amount of the refrigerant flowing into the swirl space from the refrigerant inlet.

Further, according to an eighth aspect of the present disclosure, the body portion may have a supplemental refrigerant inlet that causes the refrigerant to flow into the swirl space, and a flow direction of the refrigerant flowing into the swirl space from the refrigerant inlet and a flow direction of the refrigerant flowing into the swirl space from the supplemental refrigerant inlet may be respectively different. In this case, the swirl speed adjuster may be at least one of the inlet-side flow amount adjustment valve that adjusts the flow amount of the refrigerant flowing into the swirl space from the refrigerant inlet and a supplemental inlet-side flow amount adjustment valve that adjusts the flow amount of the refrigerant flowing into the swirl space from the supplemental refrigerant inlet.

Further, according to a ninth aspect of the present disclosure, the swirl speed adjuster may be an outlet-side flow amount adjustment valve that adjusts the flow amount of the refrigerant flowing out of the refrigerant outlet.

Further, a refrigeration cycle device may include the above-described decompression device. In this case, the refrigeration cycle device can be provided with the decompression device, which can prevent a fluctuation of the flow amount of the refrigerant discharged toward a downstream side of the decompression device with a simple structure.

BRIEF DESCRIPTION OF THE DRAWINGS

Other objects, features and advantages of the present disclosure will become more apparent from the following detailed description disposed with reference to the accompanying drawings, in which.

EMBODIMENTS FOR CARRYING OUT THE INVENTION

First Embodiment

Figure 1:
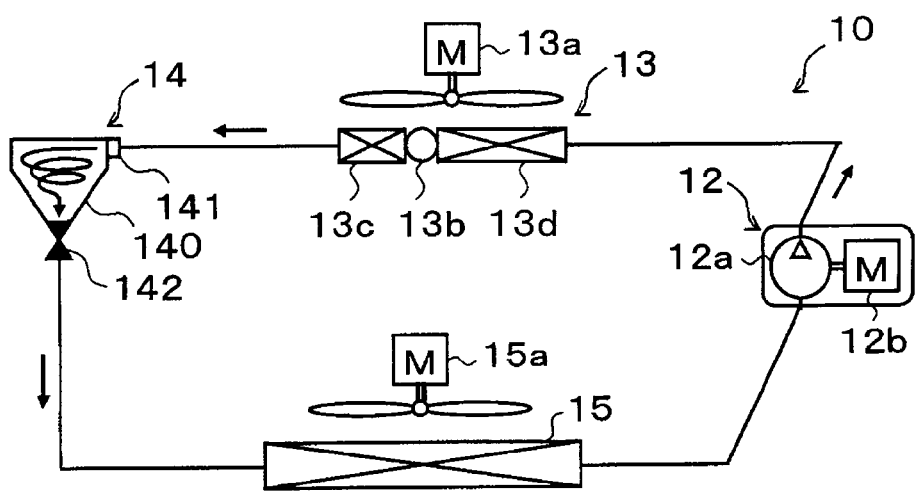
FIG. 1 is a configuration diagram of a refrigeration cycle device in a first embodiment.

A first embodiment of the present disclosure is described with reference to FIG. 1 to FIG. 4. FIG. 1 is a configuration diagram of a vapor compression type refrigeration cycle device 10 including a decompression device 14 in a present embodiment. The refrigeration cycle device 10 is applied to a vehicular air conditioner, and is configured to cool a blowing air that is blown into an air conditioning space, which is a vehicle compartment, for example.

First, a compressor 12 draws a refrigerant and pressurizes it, to raise a refrigerant pressure, and discharges the pressurized refrigerant as a high-pressure refrigerant. More practically, the compressor 12 in the present embodiment is an electric compressor that is configured to house, in one housing, a fixed-volume type compression mechanism 12a and an electric motor 12b for driving the compression mechanism 12a.

As for the compression mechanism 12a, various compression mechanisms such as a scroll type compression mechanism, a vane type compression mechanism or the like may be employed. Further, the electric motor 12b may be operated according to a control signal from a controller that is described later, for a control of its operation (i.e., a rotation number). Therefore, the motor 12b may be either of an alternate current motor or a direct current motor.

A refrigerant inlet side of a condensation portion 13d of a radiator 13 is connected to a discharge port of the compressor 12. The radiator 13 is a heat exchanger for radiating heat from the high-pressure refrigerant by causing heat exchange between the high-pressure refrigerant discharged from the compressor 12 and air outside of vehicle compartment (i.e., an outside air) that is blown by a cooling fan 13a.

More practically, the radiator 13, which is a so-called subcool type condenser, is configured to include the condensation portion 13d that radiates heat from the high-pressure refrigerant and condenses it by causing heat exchange between the high-pressure refrigerant discharged from the compressor 12 and the outside air that is blown by the cooling fan 13a, a receiver portion 13b that stores a liquid-phase refrigerant by gas-liquid separation of the refrigerant that flows out from the condensation portion 13d, and a supercooling portion 13c that supercools the liquid-phase refrigerant by causing heat exchange between the liquid-phase refrigerant flowing out of the receiver portion 13b and the outside air blown by the cooling fan 13a.

Further, the refrigeration cycle device 10 in the present embodiment uses an HFC refrigerant (e.g., R134a) as its heat medium, which is formed as a subcritical refrigeration cycle device in which a high-pressure side refrigerant pressure does not exceed a critical pressure of the refrigerant. A refrigerant such as an HFO refrigerant (e.g., R1234yf) or the like may also be used as long as the refrigerant can be use in the subcritical refrigeration cycle device.

Further, a refrigerator oil for lubricating the compressor 12 is mixed with such refrigerant, and a part of the refrigerator oil circulates through the cycle with the refrigerant. The cooling fan 13a is an electric air blower that is controlled by a control voltage outputted from the controller for a control of the rotation number (i.e., an amount of blowing air).

A refrigerant inlet 141 of the decompression device 14 is connected to a refrigerant outlet side of the supercooling portion 13c of the radiator 13. The decompression device 14 causes the refrigerant to flow toward a downstream side of the decompression device 14 after decompressing the high-pressure liquid-phase refrigerant in a supercooled state, which flows out from the radiator 13.

Figure 2:
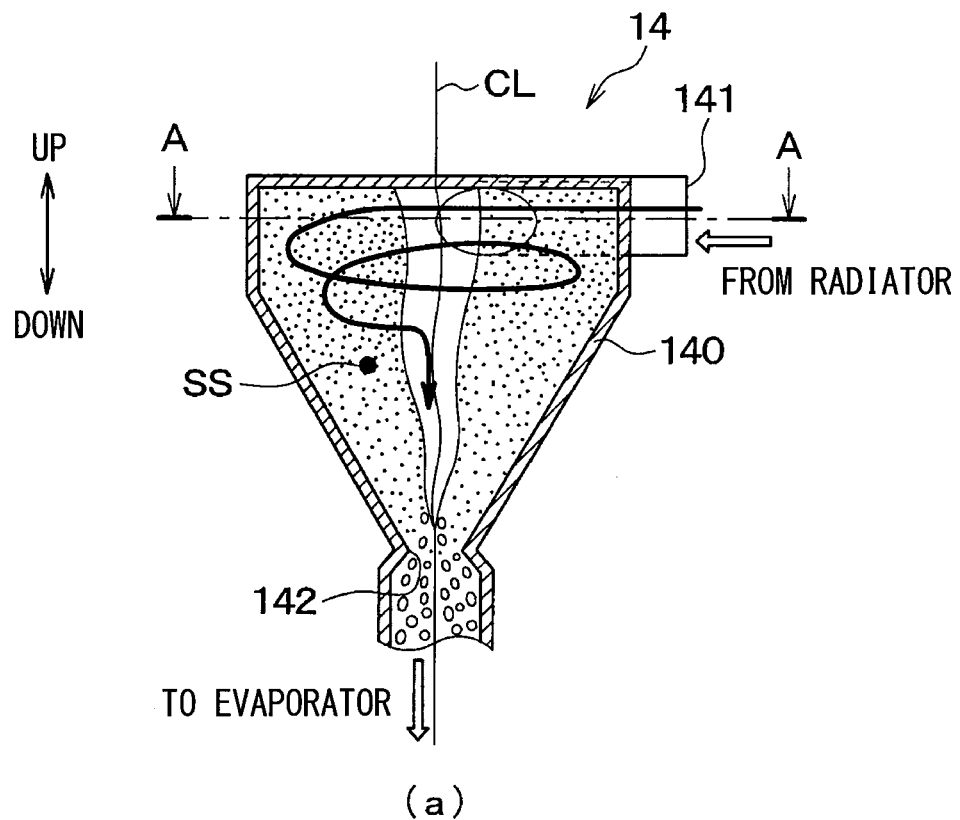
FIG. 2(a) is an axial cross-sectional view of a decompression device in the first embodiment.
FIG. 2(b) is a cross sectional view of the decompression device taken along the line A-A in FIG. 2(a)
Figure 2:
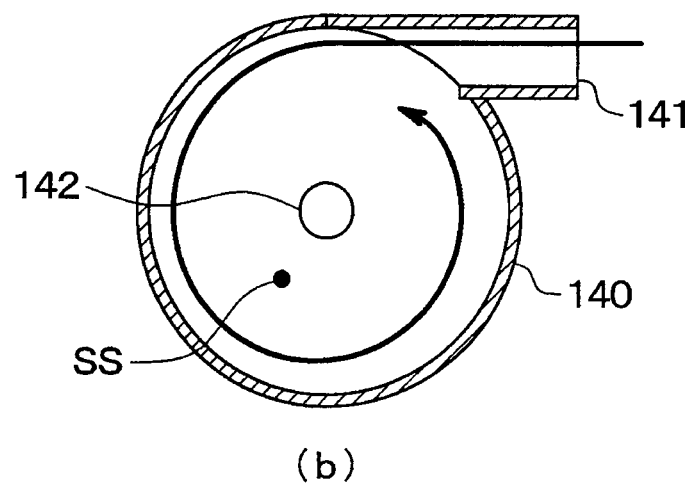

A concrete configuration of the decompression device 14 is described with reference to FIGS. 2(a) and 2(b). In FIG. 2, (a) is an axial cross sectional view of a decompression device, and (b) is a cross sectional view of the decompression device taken along the line A-A in (a). Further, in FIGS. 2(a) and 2(b), each of an up arrow and a down arrow indicates an up direction or a down direction of the refrigeration cycle device 10 when the refrigeration cycle device 10 is used for a vehicular air conditioner.

The decompression device 14 includes a body part 140 in which a swirl space SS is formed for swirling the refrigerant flowing into the swirl space from the refrigerant inlet 141. The body part 140 is formed as a hollow container made of a metal, with its outer shape having a gradually narrowing toward a lower side in a vertically-downward direction. Further, the swirl space SS in the body part 140 includes a space in a conical shape (i.e., a tapered shape) that accords with its outer shape of the body part 140.

The refrigerant inlet 141 is disposed on a conical side face of the conical-shape space, on one side of the body part 140 (i.e., an upper side in the present embodiment) having a larger cross section than the other side. Furthermore, in a view from a top side of the body part 140, an in-flow direction of the refrigerant flowing into the swirl space SS is aligned with a tangential direction of a substantially circle shape of the swirl space SS on a cross section, which is defined as a plane being substantially perpendicular to the axis of the swirl space SS as shown in FIG. 2(b).

By devising such structure, the refrigerant, which flows in from the refrigerant inlet 141, flows along an inner wall of the body part 140 as shown in FIG. 2(a), 2(b), and swirls in the swirl space SS. However, the refrigerant inlet 141 is not necessarily be disposed to flow the refrigerant in a direction that is strictly aligned with the tangent line direction of the circle shape of the swirl space SS on the cross section perpendicular to the axial direction. That is, such in-flow direction of the refrigerant inlet 141 of the decompression device 14 may include an axial component as long as such in-flow direction includes the above-described tangent line direction component.

A refrigerant outlet 142 is disposed at a tip end side of the conical shape, which is one end in the axial direction of the cone of the body part 140 (i.e., a lower side in the present embodiment), such that an out-flow direction of the refrigerant flowing out of the swirl space SS is aligned substantially with an axial direction of the swirl space SS. Therefore, the swirl space SS in the present embodiment is a space that includes a tapered space having a cross section that is perpendicular to the axis of the swirl space 142, with its area size gradually-decreasing toward an open direction of the refrigerant outlet 142.

Further, the swirl space SS of the present embodiment is, as shown in FIG. 2(a), 2(b), a space that co-axially combines a circular cylindrical shape and a circular cone shape. Therefore, when a swirl center line CL is defined as a line that is drawn to connect centers of many layers of the swirl of the refrigerant swirling in the swirl space SS, the line CL substantially matches with the axial direction of the swirl space SS, even though it is not constantly formed as a straight line, due to a disturbance of the refrigerant flow or the like. Therefore, the refrigerant outlet 142 of the present embodiment is positioned on an extension line extending from one end of the swirl center line CL.

Further, since the swirl space SS is formed to include a tapered space, a swirl speed of the refrigerant on one side (i.e., one end side of the swirl center line CL) and a swirl speed of the refrigerant on the other side (i.e., the other end side of the swirl center line CL) are different from each other. Here, the one side is a small cross section side and the other side is a large cross section side, in cross sections that are respectively perpendicular to the axis of the tapered space. Further, in the present embodiment, the swirl speed is defined as a speed of swirling in a swirl direction at a proximity of a radial outermost position on the cross section that is perpendicular to the swirl center line CL.

Further, since the refrigerant swirling in the swirl space SS receives the centrifugal force, a high-density liquid-phase refrigerant is heavily distributed to the radial outside relative to the swirl center when the refrigerant in the gas-liquid two-phase flows into the swirl space SS from the refrigerant inlet 141. Therefore, when the refrigerant in the gas-liquid two-phase flows into the space SS from the refrigerant inlet 141, a gas-phase refrigerant is heavily distributed to the radial inside relative to the swirl center line CL than the radial outside of the space SS.

Further, by the effect of the centrifugal force described above, the refrigerant pressure at or around the swirl center line CL is lower than the refrigerant pressure at the radial outside relative to the swirl center line CL. Since the refrigerant pressure at or around the swirl center line CL decreases as the centrifugal force increases, the refrigerant pressure at or around the swirl center line CL decreases when the swirl speed of the refrigerant increases in the swirl space SS.

Therefore, when the swirl speed is sufficiently increased to decrease the refrigerant pressure at or around the swirl center line CL to a level that allows a decompression boiling of the refrigerant, the gas-phase refrigerant is distributed mainly to the radial inside relative to the swirl center line CL than the radial outside, even in case that the liquid-phase refrigerant flows into the swirl space SS from the refrigerant inlet 141.

Therefore, in the present embodiment, when a passage area of the refrigerant inlet 141 is designated as Ain, a passage area of the refrigerant outlet 142 is designated as Aout, and a maximum cross-section area that is perpendicular to the axis of the swirl space SS (i.e., a cross section size of the swirl space SS in FIG. 2(a)) is designated as Ass, following expressions F1, F2 can be used to determine Ain, Aout, and Ass.

$$1 < A\text{in}/A\text{out} < 12 \quad (F1)$$

$$1 < A\text{ss}/A\text{out} \quad (F2)$$

More practically, in the present embodiment, Ain/Aout is assumed to be a value of about 2, and Ass/Aout is assumed to be a value of about 10.

In this case, since Ain/Aout in the above expression F1 is a ratio of the passage cross section size of the refrigerant inlet 141 against the passage cross section size of the refrigerant outlet 142, the smaller Ain/Aout is made, the higher the flow speed of the refrigerant flowing into the swirl space SS becomes, thereby increasing the flow speed of the refrigerant swirling in the swirl space SS.

On the other hand, when Ain/Aout is decreased to be too small, the refrigerant inlet 141 functions as a throttle, causing an energy loss in the refrigerant flowing into the swirl space SS. Therefore, Ain/Aout should be controlled to be in a certain appropriate range for sufficiently decreasing the refrigerant pressure at or around the swirl center line CL.

Further, Ass/Aout in the above expression F2, which is a ratio of the maximum cross section size of the swirl space SS against the passage cross section size of the refrigerant outlet 142, may be used as an index that represents a distance between the swirl center and the radial outermost position of the swirling flow, because the refrigerant inlet 141 is positioned at a radial outermost position in the swirl space SS and the refrigerant outlet 142 is positioned on an extension line of the swirl center line CL. Further, for a sufficient growth of the swirl flow swirling in the swirl space SS, a sufficient distance should be reserved between the swirl center and the radial outermost position.

Figure 3:
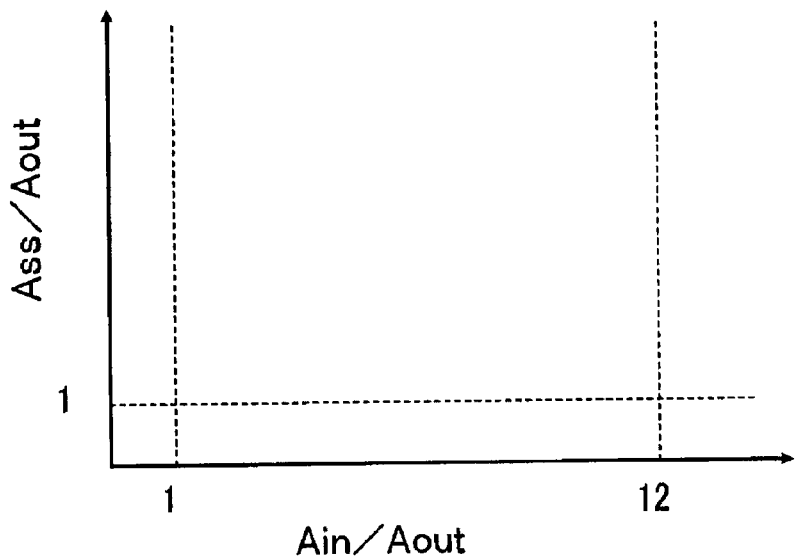
FIG. 3 is a graph showing an adequate range of Ain/Aout and Ass/Aout.

Based on such knowledge, the inventor has performed a confirmation experiment, in which, as shown in FIG. 3, the inventor has confirmed that the swirl speed is increased, so as to realize the decrease of the refrigerant pressure at or around the swirl center line CL for the decompression boiling of the refrigerant (i.e., for causing cavitations) by determining Ain, Aout, and Ass as values that satisfy the expressions F1, F2, even when the supercooled liquid-phase refrigerant flows in from the refrigerant inlet 141.

Further, the refrigerant passage cross-section size is decreased to the smallest at the refrigerant outlet 142, as clearly shown in FIG. 2(a), 2(b), among the entire passage for passing the refrigerant. Therefore, the refrigerant outlet 142 functions as a fixed throttle that has a reduced refrigerant passage area for the decompression of the refrigerant.

In this case, since the refrigerant outlet 142 is formed at a tip side of the conical-shaped body part 140, the conical-shaped inner wall of the body part 140 and the refrigerant outlet 142 form a refrigerant passage that functions as a nozzle. Further, in the present embodiment, such shape of the refrigerant passage causes an increase of the flow speed of the refrigerant flowing out of the refrigerant outlet 142, which approaches a speed of sound.

A refrigerant inlet side of an evaporator 15 is connected to the refrigerant outlet 142 of the decompression device 14. The evaporator 15, which is a heat absorbing heat exchanger for absorbing heat, evaporates a low-pressure refrigerant by using heat from heat exchange between the low-pressure refrigerant that is decompressed in a course of passing the refrigerant outlet 142 and the blowing air that is blown into the vehicle compartment by a blower fan 15a.

The blower fan 15a is an electric blower that is controlled by a control voltage from a controller for a control of the rotation number (i.e., an amount of blowing air). A suction side of the compressor 12 is connected to an outlet side of the evaporator 15.

A controller, which is not illustrated, is configured to include a well-known microcomputer and its peripheral circuit including a CPU, a ROM, a RAM and the like. The controller performs various calculations and operations based on a control program memorized in the ROM, for controlling the operation of the above-described electric type actuators 12b, 13a, 15a and the like.

Further, the controller receives various input signals such as detection values from a sensor group (not illustrated) including an external temperature sensor detecting an outside air temperature, an internal temperature sensor detecting a temperature in the vehicle compartment, and operation signals from an operation panel (not illustrated) that has an operation switch for operating the vehicular air conditioner and the like.

Further, the controller in the present embodiment is formed as a collection of controlling sections of various control objects in one body. That is, the controller is made up from many parts, and each of the many parts having a certain configuration (i.e., hardware and software) corresponds to a controlling section for controlling an operation of a control object. For example, in the present embodiment, a configuration (i.e., hardware and software) for controlling an operation of the electric motor 12b of the compressor 12 serves as a discharge capacity controller.

Next, the operation of the present embodiment having the above configuration is described. First, when an operation switch of the operation panel is put in an ON state, the controller operates the electric motor 12b of the compressor 12, the cooling fan 13a, the blower fan 15a and the like. In such manner, the compressor 12 draws refrigerant, compresses the drawn refrigerant and discharges the compressed refrigerant.

The gas-phase refrigerant in a high-temperature high-pressure state discharged from the compressor 12 flows into the condensation portion 13d of the radiator 13, and exchanges heat with a blowing air (e.g., an outside air) blown by the cooling fan 13a, to be condensed by radiating heat. The refrigerant that has radiated heat at the condensation portion 13d is separated by the receiver portion 13b into gas and liquid. The liquid-phase refrigerant separated from gas by the receiver portion 13b exchanges heat with the blowing air that is blown by the cooling fan 13a in the supercooling portion 13c, thereby to further radiate heat and to become supercooled liquid-phase refrigerant.

The supercooled liquid-phase refrigerant flowing out of the supercooling portion 13c of the radiator 13 flows into the swirl space SS from the refrigerant inlet 141 of the decompression device 14. In the swirl space SS, the swirl of the refrigerant enables a decrease of the refrigerant pressure at or around the swirl center line CL. In such manner, a decompression boiling is caused for the refrigerant at or around the swirl center line CL, and the refrigerant in the gas-liquid mixture state flows out from the refrigerant outlet 142 that is positioned on an extension line of the swirl center line CL.

Therefore, the refrigerant outlet 142 serves as a throttle, thereby decompressing the refrigerant in iso-enthalpy to be a low-pressure refrigerant when the refrigerant passes through the refrigerant outlet 142. The low pressure refrigerant decompressed at the refrigerant outlet 142 flows into the evaporator 15, and evaporates by absorbing heat from the blowing air that is blown by the blower fan 15a. In such manner, the blowing air to be blown into the vehicle compartment is cooled. The refrigerant flowing out of the evaporator 15 is drawn by the compressor 12 to be compressed again.

The refrigeration cycle device 10 of the present embodiment operating in the above-described manner is capable of cooling the blowing air that is blown into the vehicle compartment by the heat absorbing effects of the refrigerant at the evaporator 15. Further, the decompression device 14 causes the refrigeration cycle device 10 of the present embodiment to provide a stable cooling capacity by stabilizing the refrigerant flow amount flowing out of the decompression device 14 even when the state of the refrigerant flowing out of the radiator 13 changes.

In other words, the refrigeration cycle device 10 of the present embodiment having a sub-cool type condenser as the radiator 13 is capable of providing the supercooled liquid-phase refrigerant for the decompression device 14 in a normally-expected operation condition. However, when, for example, a steep rise in the outside temperature or the like is caused, the refrigerant state flowing out of the radiator 13 to flow into the decompression device 14 may be in the gas-liquid two-phase state even when the subcool type condenser is used as the radiator 13.

However, by having the decompression device 14 of the present embodiment, even when the refrigerant flowing in from the refrigerant inlet 141 is either in the supercooled liquid-phase state or in the gas-liquid two-phase state, the refrigerant in the gas-liquid mixture state can be decompressed at the refrigerant outlet 142 while flowing out therefrom. As a result, it can limit the fluctuation in the refrigerant flow amount flowing toward the downstream side, as shown in FIG. 4.

Figure 4:
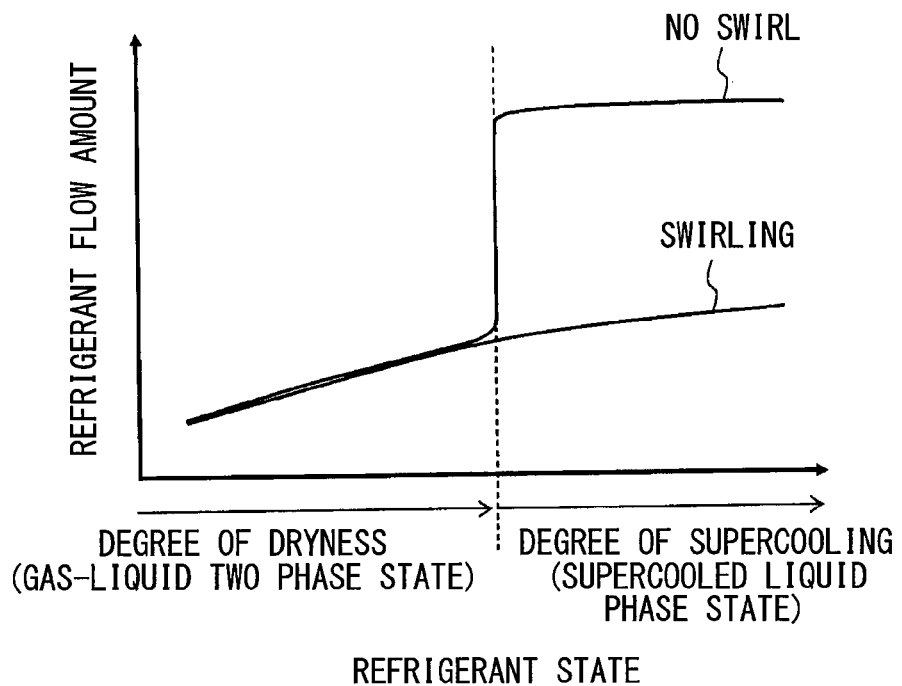
FIG. 4 is a graph showing a change of a flow amount of a refrigerant flowing out of a refrigerant outlet of a decompression device with respect to a change of state of the refrigerant flowing into a refrigerant inlet of the decompression device.

Further, FIG. 4 is a graph showing a change of a flow amount of the refrigerant flowing out of the refrigerant outlet 142 against a change of state of the refrigerant flowing into the refrigerant inlet 141, by assuming a condition that a pressure difference between a pressure of the refrigerant flowing in from the refrigerant inlet 141 of the decompression device 14 and a pressure of the refrigerant flowing out of the refrigerant outlet 142 is controlled to be constant.

As clearly shown in FIG. 4, by the swirl of the refrigerant in the swirl space SS, a greater amount of the gas-phase refrigerant is distributed to the radial inside than to the radial outside relative to the swirl center line CL, which prevents very effectively the change of the refrigerant flow amount, in comparison to a case in which the refrigerant is not swirled in the swirl space SS.

Further, by providing the refrigerant passage that is made up from the conical inner wall of the body part 140 and the refrigerant outlet 142 to be functioning as a nozzle, the flow speed of the refrigerant flowing out of the refrigerant outlet 142 is increased to a high speed that is close to a speed of sound. Therefore, even when a disturbance is caused in the refrigerant flow on the downstream side of the refrigerant outlet 142, such disturbance is prevented to be transmitted to an inside of the swirl space SS through the refrigerant outlet 142.

Therefore, the refrigerant flow amount flowing out of the swirl space SS through the refrigerant outlet 142 is stabilized more effectively and the effects of having the greater amount of the gas-phase refrigerant at the radial inside close to the swirl center line CL in the swirl space SS than the radial outside thereof are more securely achieved.

In other words, according to the decompression device 14 of the present embodiment, regardless of the state of the refrigerant flowing in from the refrigerant inlet 141, the fluctuation of the flow amount of the refrigerant flowing out of the decompression device 14 can be prevented without complicating a structure of the refrigeration cycle device. As a result, by using the decompression device 14, the refrigeration cycle device 10 is enabled to provide a stable cooling capacity.

Second Embodiment

Figure 5:
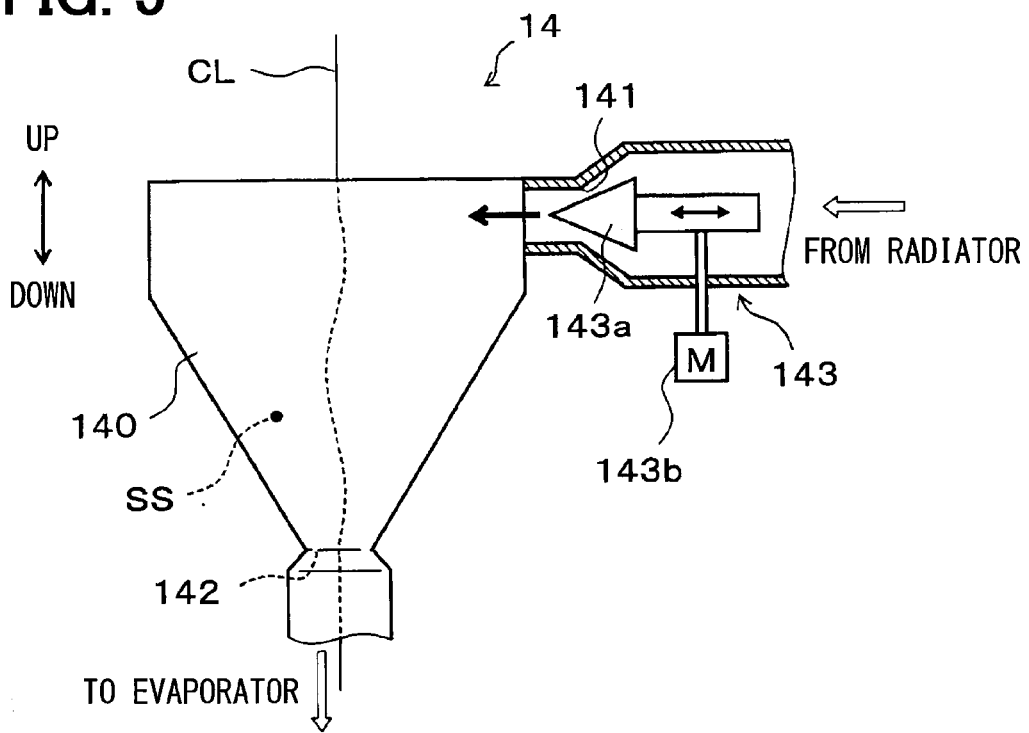
FIG. 5 is a side view showing a decompression device in a second embodiment.

In the description of an example in a second embodiment, the configuration of the decompression device 14 is modified from the first embodiment. More practically, the decompression device 14 of the present embodiment has an inlet-side flow amount adjustment valve 143 to be serving as a swirl speed adjuster, which adjusts the swirl speed of the refrigerant swirling in the swirl space SS as shown in FIG. 5. Further, FIG. 5 is a side view of the decompression device 14 of the present embodiment, in which a part of the view is shown as a cross section. Further, in FIG. 5, like numbers show like parts as the first embodiment. The same applies also to the other drawings.

The inlet-side flow amount adjustment valve 143 changes a refrigerant passage size (refrigerant passage sectional area) of the refrigerant inlet 141, and also changes the flow speed of the refrigerant flowing into the swirl space SS from the refrigerant inlet 141, thereby changing the swirl speed of the refrigerant in the swirl space SS.

More practically, the inlet-side flow amount adjustment valve 143 has a valve body 143a that adjusts an opening degree of the refrigerant inlet 141, and an electric actuator 143b that displaces the valve body 143a. Further, the electric actuator 143b is controlled by a control signal output from the controller for a control of its operation.

Further, in the present embodiment, the controller detects the temperature, the pressure and the like of the refrigerant flowing out of the radiator 13, and calculates a degree of supercooling of the refrigerant based on the detection values. Then, based on the calculated supercooling degree, the controller refers to a control map memorized in advance in a memory circuit of the controller and controls the operation of the electric actuator 143b, so that a gas-phase ratio (i.e., a quality) of the refrigerant flowing out of the refrigerant outlet 142 approaches a predetermined target quality.

Other configurations and operations are similar to the first embodiment. Therefore, when the refrigeration cycle device 10 of the present embodiment is operated, the same effects as the first embodiment are achieved.

In the above-described scheme, when the controller controls the operation of the electric actuator 143b and the valve body 143a changes the refrigerant passage size of the refrigerant inlet 141, the refrigerant flow amount flowing out of the refrigerant outlet 142 is changed. However, the change of the refrigerant flow amount for the adjustment of the gas-phase ratio of the refrigerant flowing out of the refrigerant outlet 142 is extremely small against the change of the refrigerant flow amount of the refrigerant flowing in from the refrigerant inlet 141 which is caused by the change of refrigerant state.

Therefore, the decompression device 14 of the present embodiment is capable of preventing the fluctuation of the refrigerant flow amount flowing out of the refrigerant inlet 141, without complicating the structure of the refrigeration cycle. Thus, the structure of the refrigeration cycle can be kept simple. As a result, just like the first embodiment, the refrigeration cycle device 10 can provide a stable cooling capacity.

Third Embodiment

Figure 6:
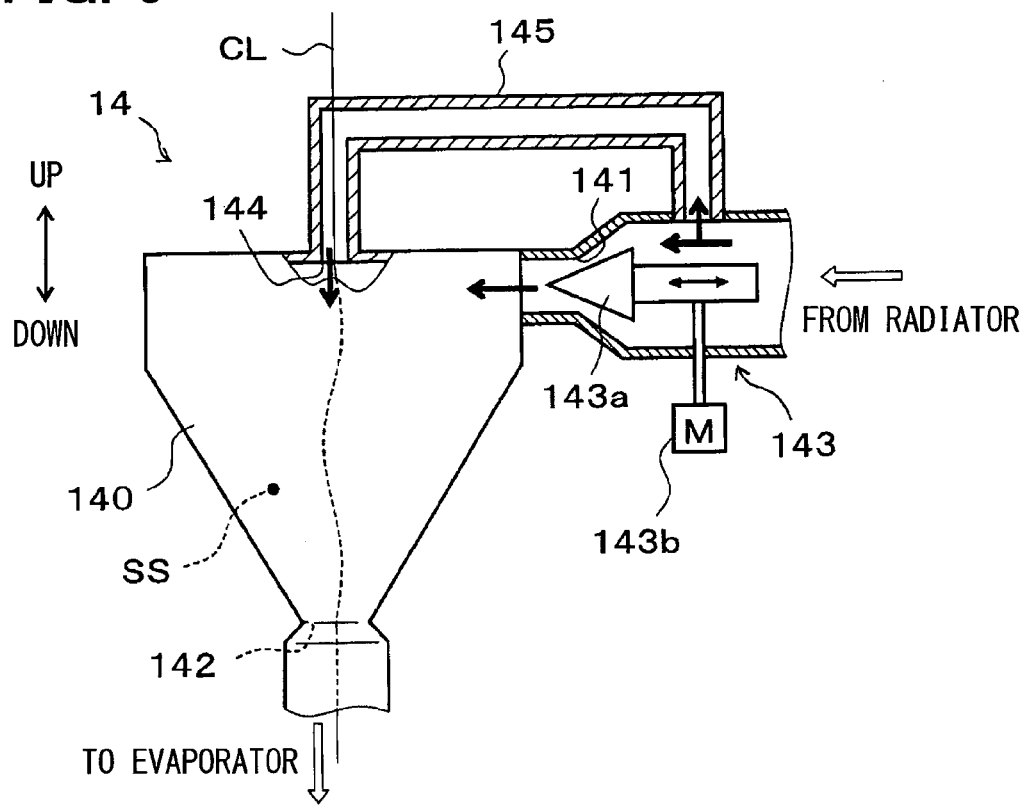
FIG. 6 is a side view showing a decompression device in a third embodiment.

In the description of an example in a third embodiment, the configuration of the body part 140 is modified from the second embodiment, such that a supplemental refrigerant inlet 144 is disposed in the body part 140 so as to cause the refrigerant to flow into the swirl space SS as shown in FIG. 6. Further, FIG. 6 is a side view of the decompression device 14 of the present embodiment, in which a part of the view is shown as a cross section. FIG. 6 in the present embodiment corresponds to FIG. 5 in the second embodiment.

The supplemental refrigerant inlet 144 is disposed at the bottom of the conical shape of the body part 140, which is one of two ends of an axis of the body part 140 (e.g., at an upper end side in the present embodiment), aligning the inflow direction of the refrigerant flowing into the swirl space SS substantially with the axial direction of the swirl space SS.

Therefore, in the present embodiment, the inflow direction of the refrigerant flowing into the swirl space SS from the refrigerant inlet 141 and the inflow direction of the refrigerant flowing into the swirl space SS from the supplemental refrigerant inlet 144 are respectively different, and a direction connecting a center part of the refrigerant outlet 142 and a center part of the supplemental refrigerant inlet 144 is substantially in parallel with the axial direction of the swirl space SS.

Further, the refrigerant flowing out of the supercooling portion 13c of the radiator 13 flows into the supplemental refrigerant inlet 144 through a bypass passage 145. The bypass passage 145 is used for the refrigerant flowing out of the supercooling portion 13c of the radiator 13 to bypass the inlet-side flow amount adjustment valve 143. Other configurations and the operations are similar to the second embodiment.

Therefore, when the refrigeration cycle device 10 of the present embodiment is operated, in addition to the same effects as the second embodiment, the fluctuation of the refrigerant flow amount toward the downstream side of the decompression device 14 is more efficiently prevented in comparison to the second embodiment, because the refrigerant flows into the swirl space SS from the supplemental refrigerant inlet 144 through the bypass passage 145. Such structure further benefits the stable cooling capacity of the refrigeration cycle device 10 of the present disclosure.

Fourth Embodiment

Figure 7:
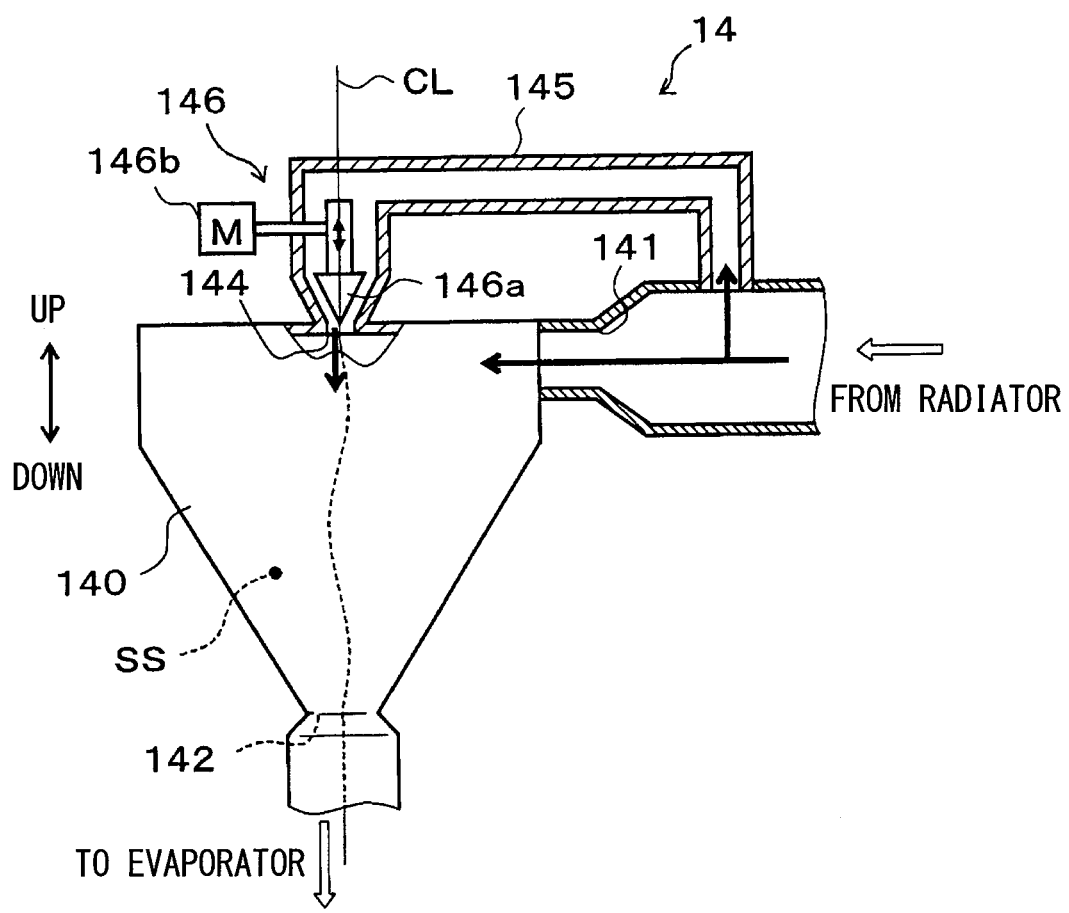
FIG. 7 is a side view showing a decompression device in a fourth embodiment.

In a fourth embodiment, as shown in FIG. 7, the inlet-side flow amount adjustment valve 143 is removed from the structure of the second embodiment, and a supplemental inlet-side flow amount adjustment valve 146 is provided, which serves as a swirl speed adjuster. Further, FIG. 7 is a side view of the decompression device 14 of the present embodiment, in which a part of the view is shown as a cross section. FIG. 7 in the present embodiment corresponds to FIG. 5 in the second embodiment.

The basic configuration of the supplemental inlet-side flow amount adjustment valve 146 is similar to the inlet-side flow amount adjustment valve 143 of the second embodiment. Therefore, the supplemental inlet-side flow amount adjustment valve 146 also has a valve body 146a that adjusts an opening degree of the supplemental refrigerant inlet 144 and an electric actuator 146b that displaces the valve body 146a.

Further, the controller detects the temperature, the pressure and the like of the refrigerant flowing out of the radiator 13, and calculates a degree of supercooling of the refrigerant based on the detection values. Then, based on the calculated supercooling degree, the controller refers to a control map memorized in advance in a memory circuit of the controller and controls the operation of the electric actuator 146b, so that a gas-phase ratio (i.e., a quality) of the refrigerant flowing out of the refrigerant outlet 142 approaches a predetermined target quality.

Other configurations and operations are similar to the second embodiment. Therefore, when the refrigeration cycle device 10 of the present embodiment is operated, the same effects as the third embodiment are achieved so that the fluctuation of the refrigerant flow amount flowing toward the downstream side of the decompression device 14 can be effectively restricted, and thereby the stable cooling capacity can be provided in the refrigeration cycle device 10.

Fifth Embodiment

Figure 8:
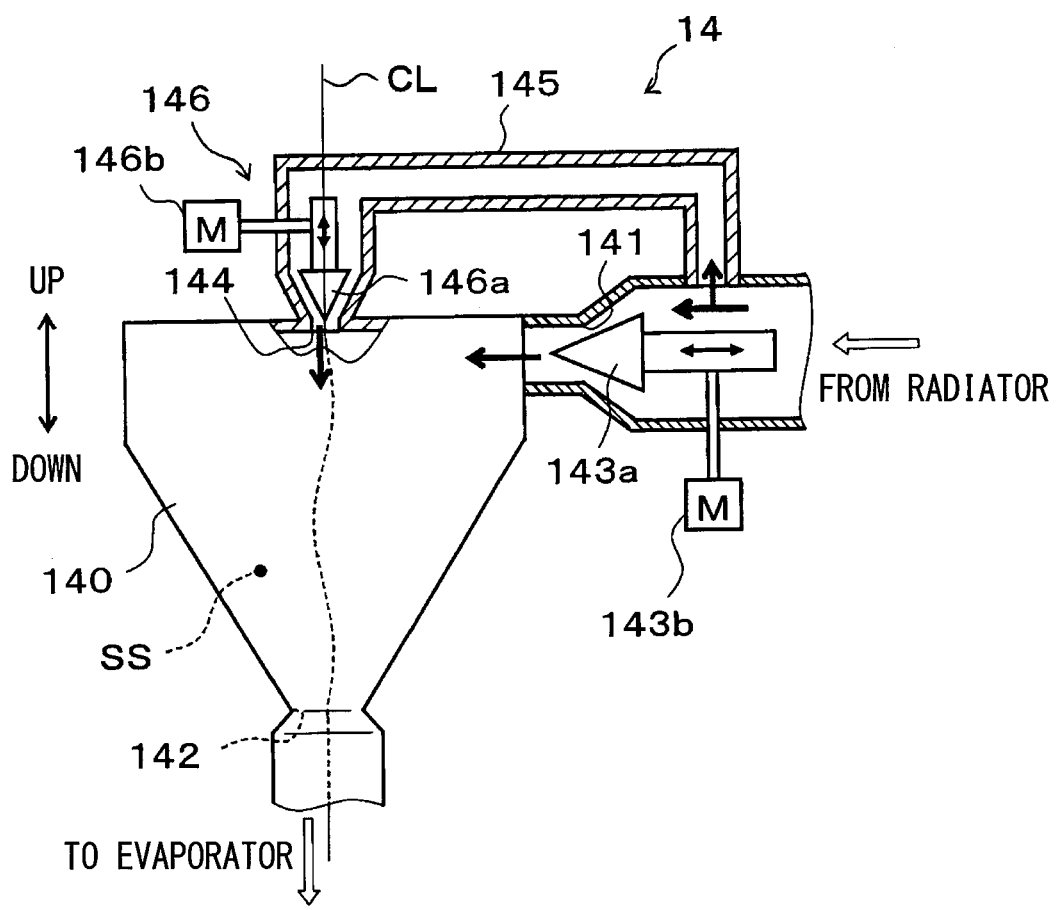
FIG. 8 is a schematic diagram showing a decompression device of a refrigeration cycle device in a fifth embodiment.

In a fifth embodiment, as shown in FIG. 8, a supplemental inlet-side flow amount adjustment valve 146 similar to the fourth embodiment is additionally provided in the structure of the second embodiment. Therefore, in the present embodiment, both of the inlet side flow amount adjustment unit 143 and the supplemental inlet-side flow amount adjustment valve 146 serve as a swirl speed adjuster. Further, FIG. 8 is a side view of the decompression device 14 of the present embodiment, in which a part of the view is shown as a cross section. FIG. 8 in the present embodiment corresponds to FIG. 5 in the second embodiment.

Further, in the present embodiment, the controller detects the temperature, the pressure and the like of the refrigerant flowing out of the radiator 13, and calculates a degree of supercooling of the refrigerant based on the detection values. Then, based on the calculated supercooling degree, the controller refers to a control map memorized in advance in a memory circuit of the controller, and controls the operation of both of the electric actuators 143b, 146b, so that a gas-phase ratio (i.e., a quality) of the refrigerant flowing out of the refrigerant outlet 142 approaches a predetermined target quality.

Other configurations and operations are similar to the second embodiment. Therefore, when the refrigeration cycle device 10 of the present embodiment is operated, the same effects as the third embodiment are achieved so that the fluctuation of the refrigerant flow amount flowing toward the downstream side of the decompression device 14 can be effectively restricted, and thereby the stable cooling capacity can be provided in the refrigeration cycle device 10.

Sixth Embodiment

Figure 9:
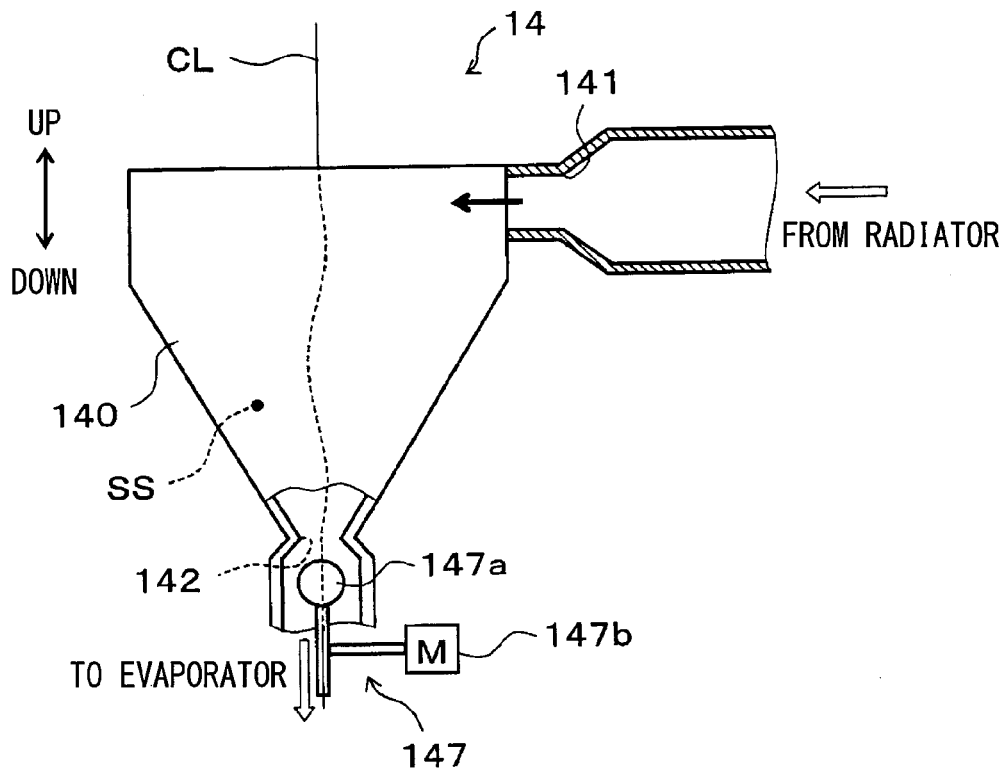
FIG. 9 is a schematic diagram showing a decompression device of a refrigeration cycle device in a sixth embodiment.

In the description of an example in a sixth embodiment, the configuration of the decompression device 14 is modified from the first embodiment. More practically, the decompression device 14 of the present embodiment has an addition of an outlet-side flow amount adjustment valve 147, which serves as a swirl speed adjuster, for the adjustment of the swirl speed of the refrigerant swirling in the swirl space SS as shown in FIG. 9. Further, FIG. 9 is a side view of the decompression device 14 of the present embodiment, in which a part of the view is shown as a cross section. FIG. 9 in the present embodiment corresponds to FIG. 5 in the second embodiment.

The outlet-side flow amount adjustment valve 147 changes a refrigerant passage size (passage sectional area) of the refrigerant outlet 142, and changes the flow amount of the refrigerant flowing out of the refrigerant outlet 142, thereby changing the swirl speed of the refrigerant in the swirl space SS.

More practically, the outlet-side flow amount adjustment valve 147 has a valve body 147a formed in a globe shape for adjusting the opening degree of the refrigerant outlet 142 and an electric actuator 147b that displaces the valve body 147a. Further, the electric actuator 147b is disposed on the downstream side of the refrigerant outlet 142, and is operated by a control signal that is output from the controller.

In the present embodiment, the controller detects the temperature, the pressure and the like of the refrigerant flowing out of the radiator 13, and calculates a degree of supercooling of the refrigerant based on the detection values. Then, based on the calculated supercooling degree, the controller refers to a control map memorized in advance in a memory circuit of the controller and controls the operation of the electric actuator 147b, so that a gas-phase ratio (i.e., a quality) of the refrigerant flowing out of the refrigerant outlet 142 approaches a predetermined target quality.

Other configurations and the operations are similar to the second embodiment. Therefore, the operation of the refrigeration cycle device 10 of the present embodiment provides the same effects as the second embodiment.

Seventh Embodiment

Figure 10:
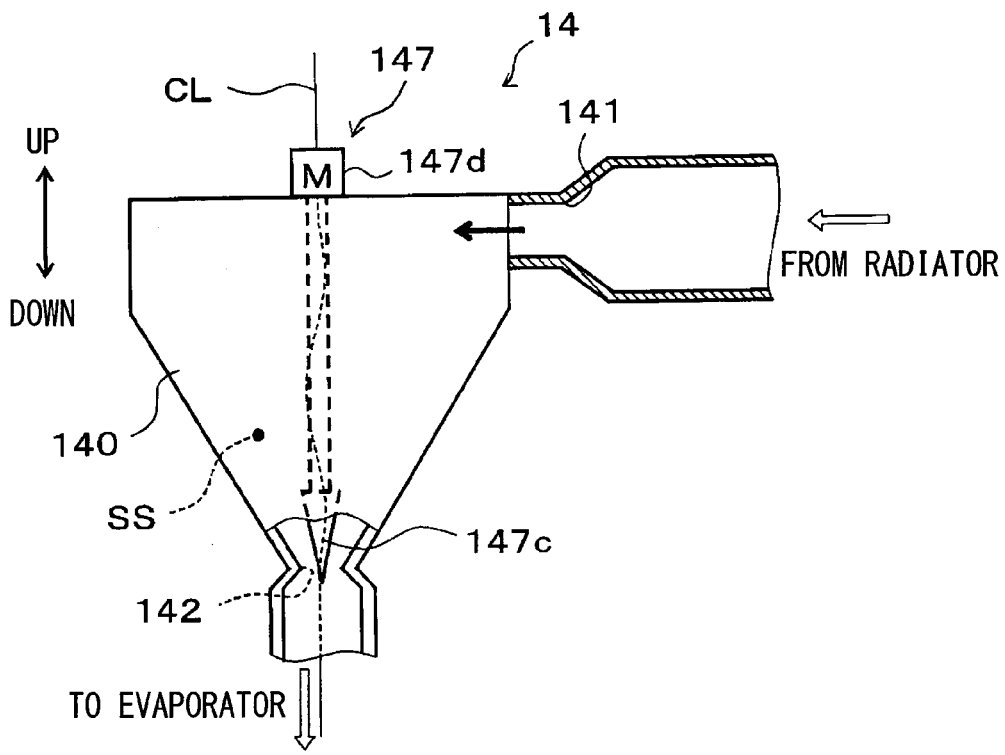
FIG. 10 is a schematic diagram showing a decompression device of a refrigeration cycle device in a seventh embodiment.

In a seventh embodiment, the configuration of the outlet-side flow amount adjustment valve 147 is modified as shown in FIG. 10, as compared with the one in the sixth embodiment. Further, FIG. 10 is a side view of the decompression device 14 of the present embodiment, in which a part of the view is shown as a cross section. FIG. 10 corresponds to FIG. 5 of the second embodiment. More practically, in the present embodiment, the outlet-side flow amount adjustment valve 147 has a valve body 147c, which is a needle valve for adjusting an opening degree of the refrigerant outlet 142, and an electric actuator 147b that displaces the valve body 147c.

Further, the electric actuator 147b of the present embodiment is disposed on an upstream side of the refrigerant outlet 142. Other configurations and operations are similar to the sixth embodiment. The configuration of the outlet-side flow amount adjustment valve 147 in the present embodiment provides substantially the same effects as the sixth embodiment.

Eighth Embodiment

Figure 11:
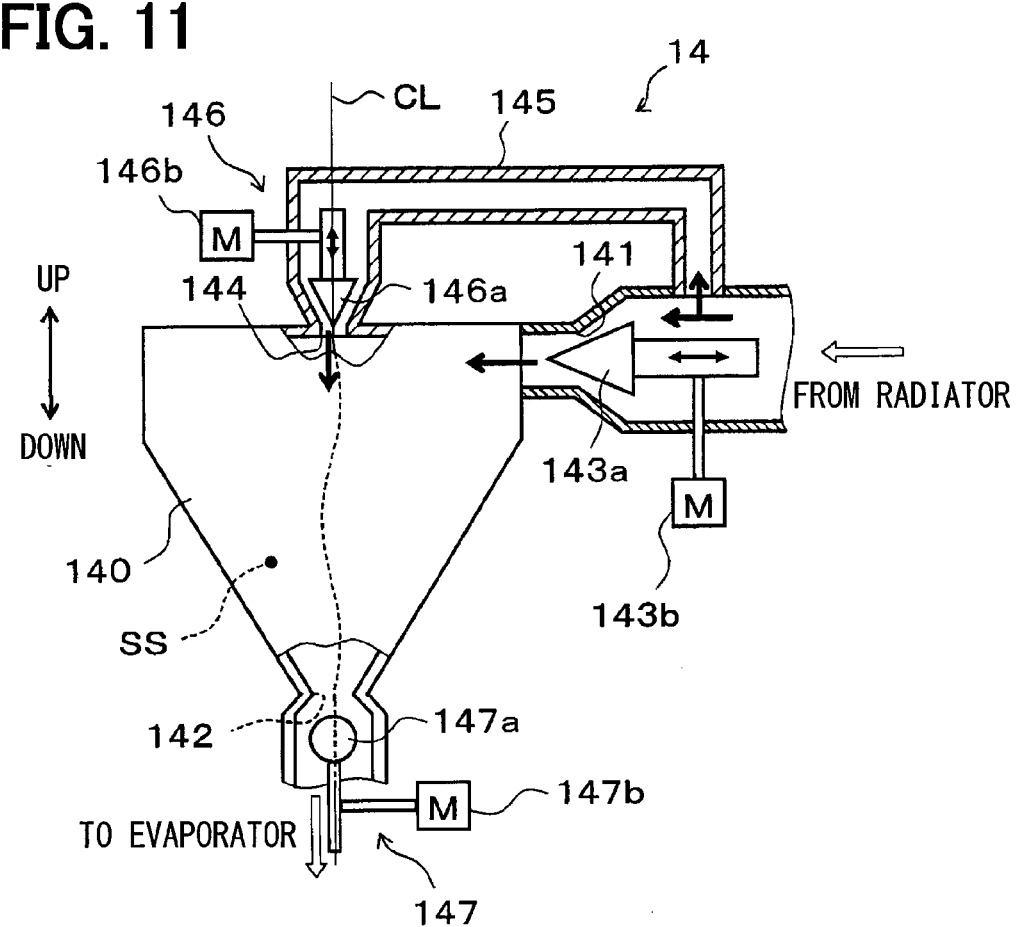
FIG. 11 is a schematic diagram showing a decompression device of a refrigeration cycle device in an eighth embodiment.

In an eighth embodiment, as shown in FIG. 11, the outlet-side flow amount adjustment valve 147 of the sixth embodiment is added to the decompression device of the fifth embodiment. FIG. 11 is a side view of the decompression device 14 of the present embodiment, in which a part of the view is shown as a cross section. FIG. 11 corresponds to FIG. 5 of the second embodiment. Other configurations and operations are similar to the fifth embodiment. In the present embodiment, a swirl speed adjuster is composed of the inlet-side flow amount adjustment valve 143, the supplemental inlet-side flow amount adjustment valve 146 and the outlet-side flow amount adjustment valve 147, and thereby it is possible to provide substantially the same effects as the fifth embodiment.

Ninth Embodiment

Figure 12:
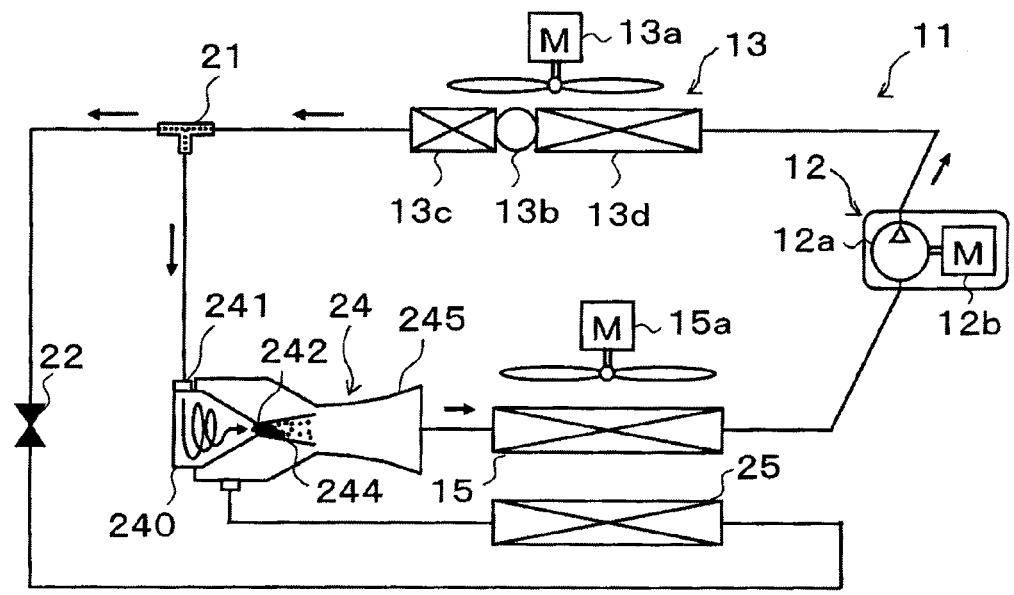
FIG. 12 is a configuration diagram of a refrigeration cycle device in a ninth embodiment.

In a ninth embodiment, the configuration of the decompression device is modified as compared with that of the first embodiment, such that an ejector that functions as a refrigerant decompression unit and a refrigerant circulation unit, as shown in FIG. 12, is used for a refrigeration cycle device (an ejector-type refrigeration cycle device) 11.

This kind of ejector-type refrigeration cycle device is capable of recovering a loss of kinetic energy that is lost in a course of decompression of the refrigerant at a nozzle part of the ejector, converting the recovered kinetic energy to a pressure energy, and increasing a pressure of the refrigerant to be drawn by the compressor 12. Therefore, the efficiency of the refrigeration cycle is improved by the decrease of the driving force of the compressor.

Figure 13:
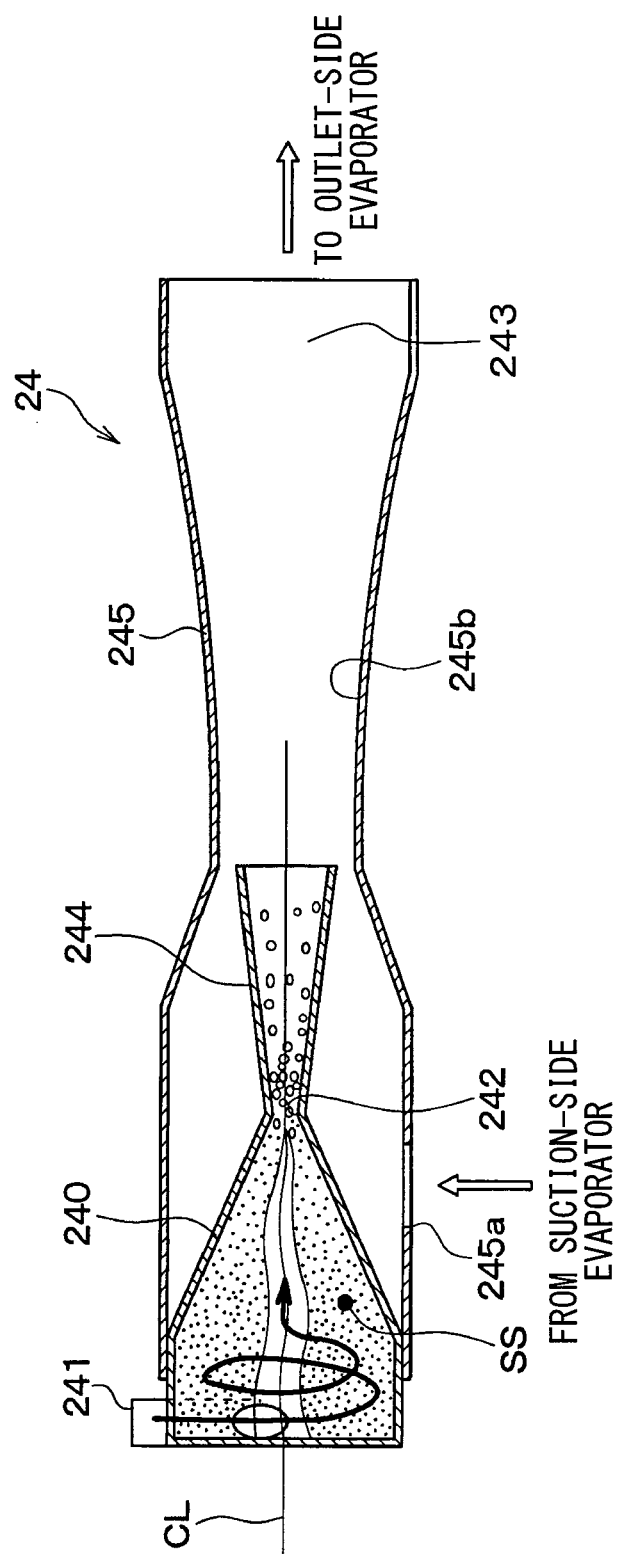
FIG. 13 is an axial cross-sectional view showing a decompression device in a ninth embodiment.

First, details of the configuration of a decompression device 24 of the present embodiment are described with reference to FIG. 13. FIG. 13 is an axial cross sectional view of the decompression device 24 of the present embodiment. The decompression device 24 of the present embodiment includes a body part 240 that has the same or similar configuration as the body part 140 of the decompression device 14 described in the first embodiment, as shown in FIG. 13. Therefore, the body part 240 has the swirl space SS in which the refrigerant is swirled, as well as a refrigerant inlet 241 and a refrigerant outlet 242 provided therein.

Further, the decompression device 24 of the present embodiment has a widening taper part 244 in which the sectional area of the refrigerant passage is inversely tapered to increase toward the downstream side of the refrigerant outlet 242, and a body portion 245. The body portion 245 includes a refrigerant suction port 245a from which the refrigerant is drawn by a jet refrigerant that is jetted from the widening taper part 244, and a diffuser part 245b in which the jetted refrigerant is mixed with a drawn refrigerant drawn from the refrigerant suction port 245a and the refrigerant pressure is increased.

The upstream side of the widening taper part 244 is connected to the refrigerant outlet 242 that functions as a throttle. Further, the conical shape inner wall of the body part 240 and the inner wall of both of the refrigerant outlet 242 and the widening taper part 244 of the decompression device 24 form a refrigerant passage that functions as a so-called Laval nozzle. In other words, the refrigerant outlet 242 of the present embodiment forms a throat where the sectional area of the refrigerant passage is minimized in the Laval nozzle.

The body portion 245 is formed substantially in a drum shape, and one end of the body portion 245 receives an outer circumference of the body part 240 to be fixed thereon in a press-fitted manner. The refrigerant suction port 245a is a port for drawing a downstream side refrigerant, which is on a downstream side of a suction side evaporator 25 that is to be described later, into an inside of the body portion 245, and the port 245a is positioned at an outer circumference side of the body part 240 and the widening taper part 244 for a communication with a refrigerant jet port of the widening taper part 244.

Therefore, a space between an inner circumference surface of the body portion 245 and a conical-shaped outer circumference surface of the body part 240 and a space between the inner circumference surface of the body portion 245 and an outer circumference surface of the widening taper part 244 respectively function as a drawn refrigerant passage. The drawn refrigerant passage guides the drawn refrigerant from the refrigerant suction port 245a to a side of the diffuser part 245b in the body portion 245.

The diffuser part 245b is positioned on the downstream side of the refrigerant flow relative to the refrigerant jet port of the widening taper part 244 and the refrigerant suction port 245a, and is formed in a shape in which the refrigerant passage sectional area is gradually increased. Thus, a flow speed of a mixed refrigerant, which is a mixture of the jetted refrigerant from the refrigerant jet port of the widening taper part 244 and the drawn refrigerant drawn from the refrigerant suction port 245a, is decreased, thereby increasing the refrigerant pressure. That is, in the diffuser part 245b, a speed energy of the mixed refrigerant is converted to a pressure energy of the refrigerant.

As in the above description, the decompression device 24 of the present embodiment is configured to have the Laval nozzle by combining the body part 240 and the widening taper part 244, and is configured to have the body portion 245. Therefore, the decompression device 24 as a whole functions as an ejector that is disclosed in, for example, the patent document 1.

Back to FIG. 12, the total configuration of the refrigeration cycle device 11 of the present embodiment will be described. First, the refrigerant outlet of the radiator 13 of the present embodiment is connected to the refrigerant inlet of a branch part 21 that divides the refrigerant flow into branch passages. The branch part 21 is formed by a three-way joint that has three ports for flow-in and flow-out of the refrigerant, among which one port is used as the refrigerant inlet, and the other two are used as the refrigerant outlets. Such three-way joint may be formed as a combination of three pipes which may have respectively different pipe diameters, or may be formed as a resin/metal block having multiple refrigerant passages bored therein with respectively different passage diameters.

To one of the refrigerant outlets of the branch part 21, the refrigerant inlet 241 of the decompression device 24 is connected, and to the other one of the refrigerant outlets of the branch part 21, the suction side evaporator 25 is connected via a fixed throttle 22 which serves as a branch side decompression device. As the fixed throttle 22, an orifice, a capillary tube or the like may be employed.

The suction side evaporator 25 evaporates a low-pressure refrigerant by causing heat exchange between the low-pressure refrigerant and the blowing air that is blown by the blower fan 15a after passing through the evaporator 15. The suction side evaporator 25 functions as a heat absorbing heat exchanger in which the refrigerant is evaporated by absorbing heat from the blowing air. The basic configuration of the suction side evaporator 25 is similar to the one of the evaporator 15. The refrigerant suction port 245a of the decompression device 24 is connected to the refrigerant outlet side of the suction side evaporator 25. Further, in the present embodiment, the evaporator 15 is designated hereafter as an outlet side evaporator 15 in order to clearly distinguish the difference between the evaporator 15 and the suction side evaporator 25.

Further, the refrigerant inlet side of the outlet side evaporator 15 is connected to a refrigerant outlet 243 of the diffuser part 245b which is positioned on the downstream side of the refrigerant flow from the refrigerant outlet 242 of the decompression device 24, and the suction side of the compressor 12 is connected to the refrigerant outlet side of the outlet side evaporator 15. Thus, the suction side of the compressor 12 is connected to the refrigerant outlet 243 of the decompression device 24 via the outlet side evaporator 15. The other configurations are similar to the first embodiment.

The operation of the present embodiment according to the above configuration will be described. When the controller operates the compressor 12, a high-temperature and high-pressure refrigerant is discharged from the compressor 12 and flows into the radiator 13 to be cooled and condensed. The flow of the high-pressure refrigerant flowing out of the radiator 13 is divided into two streams at the branch part 21, which are a refrigerant stream flowing into the refrigerant inlet 241 of the decompression device 24 and a refrigerant stream flowing into the fixed throttle 22.

The high-pressure refrigerant flowing out of the branch part 21 into the decompression device 24 swirls in the swirl space SS, and flows out of the refrigerant outlet 242 in the decompression device 24. Similarly to the first embodiment, the refrigerant in the gas-liquid mixture state flows out of the refrigerant outlet 242 that is positioned on an extension line of the swirl center line CL.

The refrigerant flowing into the refrigerant inlet 241 is decompressed while the refrigerant passes through the refrigerant outlet 242 in the decompression device 24. More specifically, in the decompression device 24 of the present embodiment, serving as the Laval nozzle by using the body part 240 and the widening taper part 244, the refrigerant passing through the refrigerant outlet 242 is decompressed in iso-entropy, and is jetted from the refrigerant jet port of the widening taper part 244 at a flow speed exceeding a speed of sound.

Due to a suction effect of the jetted high-speed refrigerant stream, the refrigerant flowing out of the suction side evaporator 25 is drawn into the refrigerant suction port 245a. The jetted refrigerant jetted from the widening taper part 244 and the drawn refrigerant drawn into the refrigerant suction port 245a respectively flow into the diffuser part 245b of the decompression device 24 to be mixed therein. In the diffuser part 245b, the speed energy of the refrigerant is converted to the pressure energy due to the refrigerant passage expansion. In such manner, the jetted refrigerant and the drawn refrigerant are mixed together, and the pressure of the mixed refrigerant rises in the decompression device 24.

The refrigerant flowing out of the diffuser part 245b flows into the outlet side evaporator 15, absorbs heat from the blowing air that is blown by the blower fan 15a, and evaporates. In such manner, the blowing air to be sent into the vehicle compartment is cooled. The refrigerant flowing out of the outlet side evaporator 15 is drawn into the compressor 12, and then is compressed again.

The refrigerant flowing into the refrigerant inlet 241 is decompressed to be a middle-pressure refrigerant while passing through the refrigerant outlet 242 of the decompression device 24. The refrigerant decompressed in the refrigerant outlet 242 mixes with the drawn refrigerant drawn from the suction port 245a in the diffuser part 245b.

On the other hand, the refrigerant flowing out of the branch part 21 to a side of the fixed throttle 22 is decompressed in iso-enthalpy at the fixed throttle 22, and flows into the suction side evaporator 25. The refrigerant flowing into the suction side evaporator 25 absorbs heat from the blowing air, which is blown by the blower fan 15a and has been cooled by the outlet side evaporator 15, and evaporates. In such manner, the blowing air to be sent into the vehicle compartment is further cooled. The refrigerant flowing out of the suction side evaporator 25 is drawn from the refrigerant suction port 245a into the diffuser part 245b.

The refrigeration cycle device 11 of the present embodiment is, due to the above-described operation, capable of cooling the blowing air that is blown by the blower fan 15a to pass through the outlet side evaporator 15 and through the suction side evaporator 25 in this order. In such case, a refrigerant evaporation pressure at the outlet side evaporator 15 is equated to a pressure after the pressure rise at the diffuser part 245b, and a refrigerant evaporation pressure at the suction side evaporator 25 is equated to a pressure that is just after the decompression at the refrigerant outlet 242 which is the lowest pressure.

Therefore, the refrigerant evaporation pressure (i.e., a refrigerant evaporation temperature) at the suction side evaporator 25 is controlled to be lower than the refrigerant evaporation pressure (i.e., a refrigerant evaporation temperature) at the outlet side evaporator 15. As a result, respective temperature differences between (i) the refrigerant evaporation temperatures at the outlet side evaporator 15 and the suction side evaporator 25 and (ii) the temperature of the blowing air can be secured, thereby effectively cooling the blowing air.

Further, since the refrigeration cycle device 11 of the present embodiment employs the decompression device 24 that functions as an ejector, the refrigerant flow amount flowing out of the refrigerant outlet 242 of the decompression device 24 is stabilized, thereby effectively improving the cycle efficiency in the above-described ejector-type refrigeration cycle device.

According to the decompression device 24 of the present embodiment, the refrigerant flowing out of the refrigerant outlet 242 is controlled to be in the gas-liquid mixture state (i.e., in the gas-liquid two-phase state, or in a refrigerant state in which the liquid-phase refrigerant has bubbles mixed therein).

In such manner, boiling of the refrigerant at the refrigerant outlet 242 which serves as a throttle is facilitated, and a nozzle efficiency of the decompression device 24 functioning as an ejector is improved, thereby achieving a suction capacity and a pressure increasing capacity in a stable state. Therefore, even when heat load of the refrigeration cycle is changed to cause the change in the flow amount of the refrigerant circulated in the cycle, the cycle efficiency of the ejector-type refrigeration cycle device can be effectively improved.

Further, the decompression device 24 of the present embodiment is configured to have the refrigerant passage that functions as the Laval nozzle by using the body part 240, the refrigerant outlet 242 and the widening taper part 244, and is configured to jet the refrigerant from the refrigerant jet port of the widening taper part 244 at a jetting speed that exceeds a speed of sound. Therefore, even when a disturbance is caused in the refrigerant flow on the downstream side of the decompression device 24, such disturbance can be prevented to be transmitted to an inside of the swirl space SS through the refrigerant outlet 242.

Therefore, the refrigerant flow amount flowing out of the swirl space SS through the refrigerant outlet 242 is stabilized, and the effects of the swirl of the refrigerant at a certain speed that distributes a greater amount of gas refrigerant to the radial inside of the swirl space than the radial outside relative to the swirl center line CL are more securely provided.

Further, the decompression device 24 of the present embodiment may be provided with the inlet-side flow amount adjustment valve 143 described in any one of the second, third, fifth and eighth embodiments, or the bypass passage 145 described in any one of the third to fifth and eighth embodiments, or the supplemental inlet-side flow amount adjustment valve 146 described in any one of the fourth, fifth and eighth embodiments, or the outlet-side flow amount adjustment valve 147 described in any one of the sixth to eighth embodiments.

In such manner, the efficiency improvement effects of the refrigeration cycle of the ejector-type refrigeration cycle device are more securely provided, and the suction capacity and the pressure increasing capacity of the decompression device 24 that functions as an ejector are more stably obtained.

Tenth and Eleventh Embodiments

Figure 14:
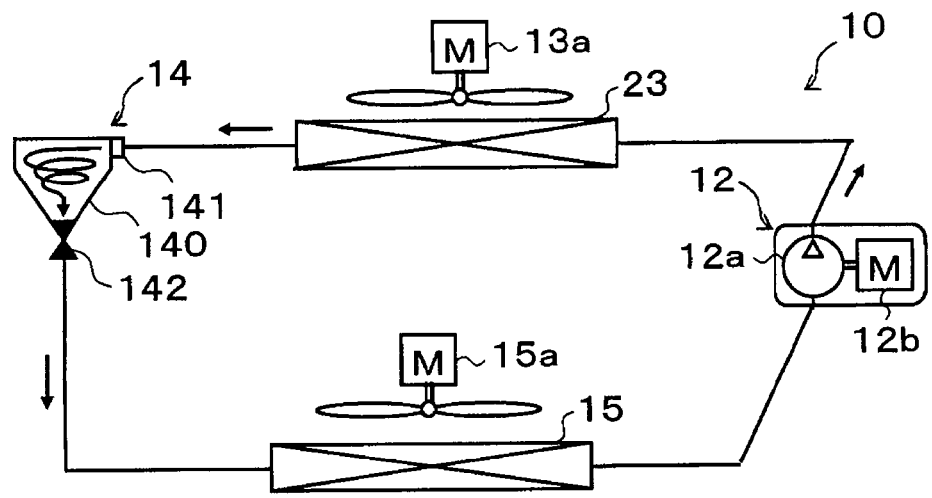
FIG. 14 is a configuration diagram showing a refrigeration cycle device in a tenth embodiment.

In the tenth embodiment, the refrigeration cycle device 10 of the first embodiment is modified, as shown in the configuration of FIG. 14, to have a different radiator. More specifically, a radiator 23 of the present embodiment is not formed as the sub-cool type condenser, but is formed as a condensation portion that cools and condenses the refrigerant.

Therefore, the state of the refrigerant flowing out of the radiator 23 may change due to the change of the outside temperature or the like. In other words, the state of the refrigerant flowing into the decompression device 14 may change from the gas-liquid two-phase state to the liquid-phase state, or from the liquid-phase state to the gas-liquid two-phase state, to have a transition between those states passing across the saturated-gas line.

However, since the refrigeration cycle device 10 of the present embodiment is provided with the decompression device 14, it is possible to decompress the refrigerant flowing through the refrigerant outlet 142 of the decompression device 14, regardless of the state of the refrigerant flowing from the refrigerant inlet 141, which may be in the supercooled liquid-phase state or in the gas-liquid two-phase state, thereby providing the stable cooling capacity in the refrigeration cycle device 10.

Figure 15:
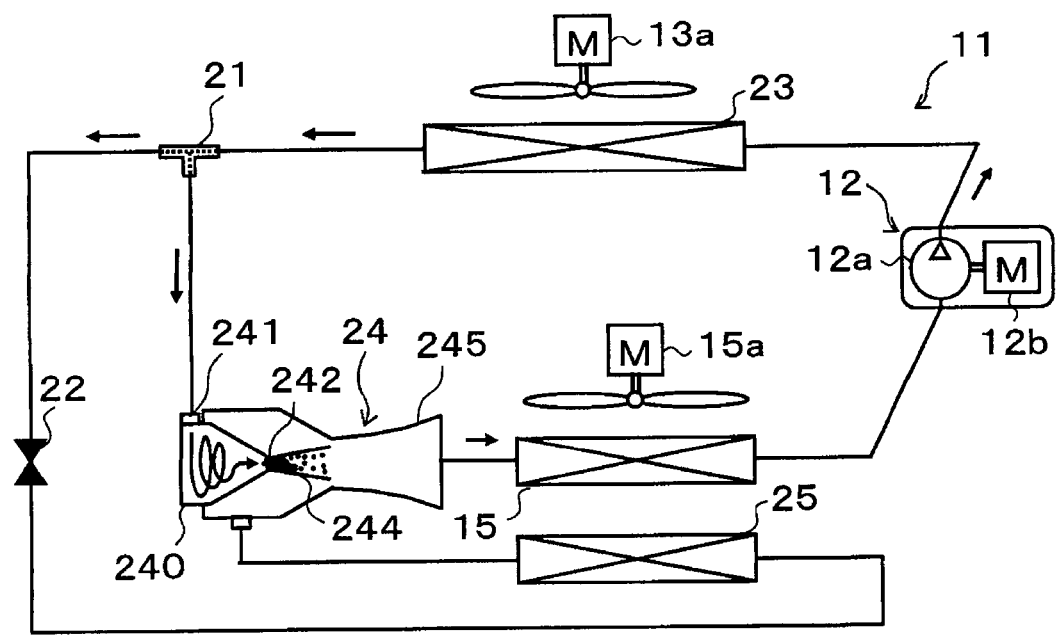
FIG. 15 is a configuration diagram showing a refrigeration cycle device in an eleventh embodiment.

Further, in the eleventh embodiment, the refrigeration cycle device 11 of the ninth embodiment is modified to have a configuration shown in FIG. 15 that includes the same radiator 23 as that of the tenth embodiment.

Since the refrigeration cycle device 11 of the present embodiment is equipped with the decompression device 24, the cycle efficiency of the ejector-type refrigeration cycle device is more securely improved, and the suction capacity and the pressure increasing capacity are more stably provided by the decompression device 24 that functions as an ejector, which is same as the second embodiment.

Twelfth and Thirteenth Embodiments

Figure 16:
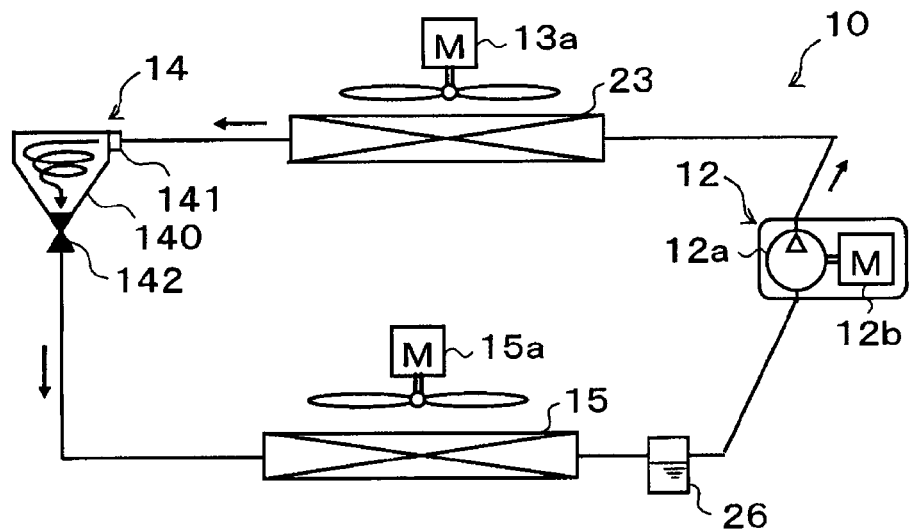
FIG. 16 is a configuration diagram showing a refrigeration cycle device in a twelfth embodiment.

In the twelfth embodiment, the refrigeration cycle device 10 of the tenth embodiment is modified, as shown in the configuration in FIG. 16, to have an accumulator 26 that stores the liquid-phase refrigerant by separating liquid from gas in the refrigerant to be drawn into the compressor 12. Other configurations and operations are same as the tenth embodiment. Therefore, the refrigeration cycle device 10 of the twelfth embodiment has at least the same effects described in the tenth embodiment.

In addition, in the cycle having such accumulator 26, the gas-phase refrigerant is securely supplied to the suction side of the compressor 12, so as to prevent a liquid compression in the compressor 12. Therefore, based on the temperature or the pressure of the refrigerant that flows out of the radiator 23, the operation of the compressor 12 can be controlled for maximizing the cycle efficiency. In this case, the improvement of the cycle efficiency is further facilitated.

Figure 17:
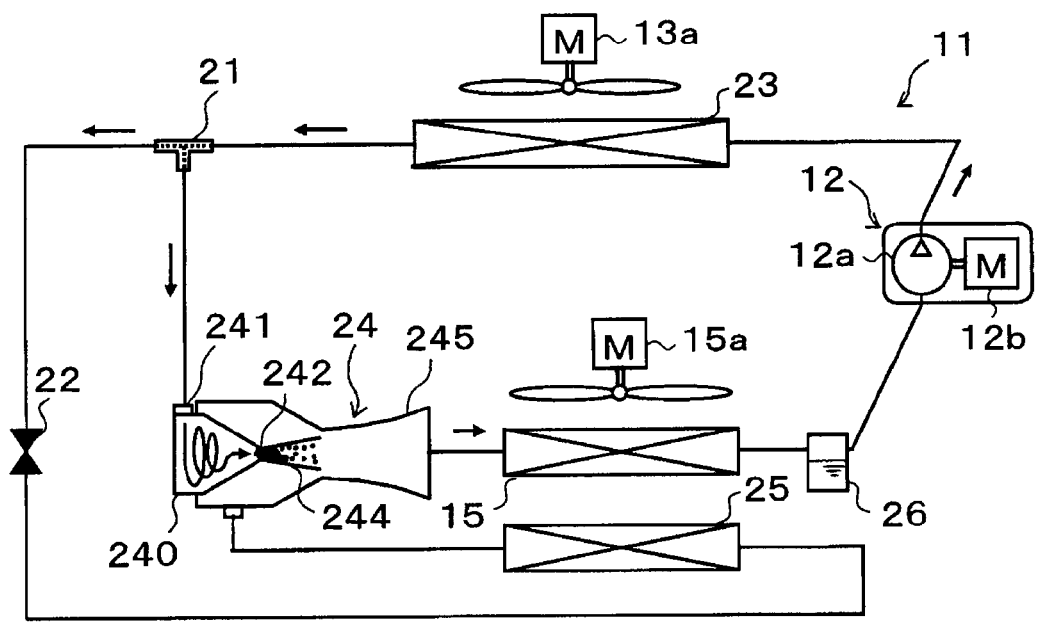
FIG. 17 is a configuration diagram showing a refrigeration cycle device in a thirteenth embodiment.

In the thirteenth embodiment, the refrigeration cycle device 11 of the eleventh embodiment is modified, as shown in the configuration of FIG. 17, to have an accumulator 26 that stores the liquid-phase refrigerant by separating liquid from gas in the refrigerant that is to be drawn into the compressor 12. Other configurations and operations are same as the eleventh embodiment. Therefore, the refrigeration cycle device 10 of the thirteenth embodiment has at least the same effects as the eleventh embodiment, and the liquid compression in the compressor 12 can be prevented.

Other Embodiments

The present disclosure may have various changes and modifications as long as the disclosure pertains to a patentable scope without limitation. The following are some examples of such modifications.

(1) In each of the above-described embodiments, the swirl space SS of the decompression devices 14, 24 is a space having a co-axially combined shape made up from the cylindrical shape and the conical shape. However, the shape of the swirl space SS is not limited to such shape. For example, in the decompression device 14 of the first embodiment, the ortho-axis cross section, which is defined as a cross section perpendicular to a line that connects the center part of the refrigerant outlet 142 at one axial end and the center part of the another axial end may have an oval shape, or may have a polygonal shape. In other words, the shape of the cross section may be other shape than a circle.

In such case, the swirl center line CL does not agree with the axis of the swirl space SS. However, as long as the refrigerant outlets 142, 242 are positioned on an extension line extending from one end of the swirl center line CL on a normally-expected driving condition of the refrigeration cycle device 10, it suffices the requirement.

In the above embodiments, the above expression F2 is used as an index that represents a distance between the center of the swirl and the outermost position of the swirl. In other words, based on the above expression F2, a condition for sufficiently growing/developing the swirling flow of the refrigerant in the swirl space SS can be set, regardless of the shape of the cross section that is perpendicular to the open direction of the refrigerant outlet 142, which may include the oval shape, the polygonal shape or the like.

(2) In the above embodiments, the refrigerant outlet 142 has a reduced-size refrigerant passage to be functioning as a fixed throttle, just like an orifice. However, the refrigerant outlet 142 may also function as a throttle by other means. For example, the refrigerant outlet 142 of the decompression device 14 may be formed by using a capillary tube or may be connected to a capillary tube.

(3) In the above-described first to eighth, tenth and twelfth embodiments, the decompression device 14 is used for a standard refrigeration cycle device. However, an application of the decompression device 14 is not limited to such form.

For example, the decompression device 14 may be applied to a so-called economizer refrigeration cycle device in which two compressors are provided in combination as a low-step side compression mechanism and a high-step side compression mechanism for multi-step compression of the refrigerant, and a middle-pressure refrigerant in the refrigerant cycle is joined with the refrigerant that is discharged from the low-step side compression mechanism to be drawn into the high-step side compression mechanism.

Further, in the above-described ninth, eleventh, and thirteenth embodiments, the ejector-type refrigeration cycle device is described, which includes the branch part 21 that divides the flow of the refrigerant flowing out of the radiators 13, 23 into two branched streams. In this case, one of the refrigerant outlets of the branch part 21 is connected to the refrigerant inlet 241 of the decompression device 24 that functions as an ejector. However, the decompression device 24 may be applicable to an ejector-type refrigeration cycle device, other than the above-described one.

For example, the ejector-type refrigeration cycle device may have a following cycle configuration in which a low-pressure side branch part is provided for dividing a flow of the refrigerant flowing out of the diffuser part 245b of the decompression device 24 to a stream of the refrigerant flowing from one branch of the low-pressure branch part into the outlet side evaporator 15 and to a stream of the refrigerant flowing from the other branch of the low-pressure branch part into the suction side evaporator 25.

Further, the configuration in the above-described embodiments, in which the outlet side evaporator 15 and the suction side evaporator 25 are used to cool the same air conditioning space (e.g., the vehicle compartment), may be modified to cool respectively different air conditioning spaces. For example, while the outlet side evaporator 15 may be used to cool an inside of a refrigerator, the suction side evaporator 25 that has a lower refrigerant evaporation pressure (i.e., a lower refrigerant evaporation temperature) than the outlet side evaporator 15 may be used to cool an inside of a freezer.

(4) In the above-described embodiments, the refrigeration cycle device 10, 11 having the decompression device 14, 24 of the present disclosure are applied to the vehicular air conditioner. However, the refrigeration cycle device 10, 11 having the decompression device 14, 24 of the present disclosure are not limited to such form. For example, it may be applicable to a stationary air conditioner, a cooling/heating storage, a cooling/heating device of a vending machine or the like.

(5) In the above-described embodiments, as an example, the radiators 13, 23 are used as an external heat exchanger for exchanging heat between refrigerant and an outside air, and the evaporator (i.e., an outlet side evaporator) 15 and the suction side evaporator 25 are used as a use side heat exchanger for cooling a blowing air that is to be sent into the vehicle compartment. However, the evaporator (i.e., an outlet side evaporator) 15 and the suction side evaporator 25 may be used as the external heat exchanger for absorbing heat from a heat source such as the outside air and the radiators 13, 23 may be used as the internal heat exchanger for heating an object to be heated such as air, water and the like, for constituting a heat pump cycle.

What is claimed is:

1. A decompression device for a refrigeration cycle device, the decompression device comprising:
   a refrigerant inlet into which refrigerant flows;
   a refrigerant outlet from which the refrigerant after being decompressed flows out; and
   a body part that forms a swirl space in which the refrigerant flowing from the refrigerant inlet swirls at a speed being decompression-boiled and being a gas-liquid two phase refrigerant;
   a widening taper part connected to a downstream refrigerant side of the refrigerant outlet and having a refrigerant passage sectional area that gradually increases toward the downstream refrigerant side; and
   a body portion that includes a refrigerant suction port from which the refrigerant is drawn by a jet refrigerant that is jetted from the widening taper part, and a diffuser part in which a pressure of a mix refrigerant that is mixture of the jet refrigerant and the drawn refrigerant drawn from the refrigerant suction port is increased, wherein
   the refrigerant inlet introduces the refrigerant tangentially to an inner circular surface of the swirl space to promote the swirling of the refrigerant flowing from the refrigerant inlet,
   the refrigerant outlet has a throttle in which a refrigerant passage area is decreased to decompress the refrigerant, and the gas-liquid two phase refrigerant flows through the throttle of the refrigerant outlet,
   the swirl space causes the refrigerant to swirl at a swirl speed such that a greater amount of gas-phase refrigerant is distributed to a radial inside of the swirl space than to a radial outside of the swirl space relative to a swirl center line when the swirl center line in the swirl space is defined as a line connecting center points of swirling of the refrigerant,
   the refrigerant outlet is positioned on an extension line of the swirl center line,
   the refrigerant inlet and the refrigerant outlet are configured to have $1 < Ain/Aout < 12$, when a passage cross-sectional area of the refrigerant inlet is designated as Ain and a passage cross-sectional area of the refrigerant outlet is designated as Aout, and
   the swirl space includes a tapered space in which a cross-sectional area of the tapered space gradually decreases toward an open direction of the refrigerant outlet.

2. The decompression device of claim 1, wherein the refrigerant outlet is connected to a capillary tube.

3. The decompression device of claim 1, further comprising
   a swirl speed adjuster which adjusts the swirl speed.

4. The decompression device of claim 3, wherein
the swirl speed adjuster is constructed of an inlet-side flow amount adjustment valve which adjusts a flow amount of the refrigerant flowing into the swirl space from the refrigerant inlet.

5. The decompression device of claim 3, wherein
the body part has a supplemental refrigerant inlet from which the refrigerant flows into the swirl space,
a flow direction of the refrigerant flowing into the swirl space from the refrigerant inlet is different from a flow direction of the refrigerant flowing into the swirl space from the supplemental refrigerant inlet, and
the swirl speed adjuster is constructed of at least one of an inlet-side flow amount adjustment valve which adjusts the flow amount of the refrigerant flowing into the swirl space from the refrigerant inlet and a supplemental inlet-side flow amount adjustment valve which adjusts the flow amount of the refrigerant flowing into the swirl space from the supplemental refrigerant inlet.

6. The decompression device of claim 3, wherein
the swirl speed adjuster is constructed of an outlet-side flow amount adjustment valve which adjusts the flow amount of the refrigerant flowing out of the refrigerant outlet.

7. The decompression device of claim 1, wherein
the swirl speed is a speed at which the refrigerant at or around the swirl center line is decompression-boiled.

8. The decompression device of claim 1, wherein
the swirl space is formed only by an inner wall surface of the body part.

9. The decompression device of claim 1, wherein
the swirl space is a single space without being separated.

10. A refrigeration cycle device comprising the decompression device of claim 1.

11. The decompression device of claim 1, wherein the refrigerant outlet is a single refrigerant outlet.

12. The decompression device of claim 1, wherein the refrigerant inlet is perpendicular to the swirl center line to promote the swirling of the refrigerant flowing from the refrigerant inlet.

13. The decompression device for the refrigeration cycle device of claim 1, wherein
the refrigeration cycle device has:
    a compressor that draws and pressurizes refrigerant; and
    a radiator,
the radiator has:
    a condensing part that condenses a discharged refrigerant discharged by the compressor by promoting a heat radiation of the discharged refrigerant; and
    a super-cooling part that super-cools a refrigerant flowing from the condensing part to be supercooled liquid refrigerant,
the supercooled liquid refrigerant from the super-cooling part flows into the refrigerant inlet.

14. The decompression device for the refrigeration cycle device of claim 1, wherein,
the refrigeration cycle device has an evaporator, and
the refrigerant outlet is directly connected to the evaporator via a refrigerant conduit.

15. A decompression device for a refrigeration cycle device, the decompression device comprising:
a refrigerant inlet into which refrigerant flows;
a refrigerant outlet from which the refrigerant after being decompressed flows out; and
a body part that forms a swirl space in which the refrigerant flowing from the refrigerant inlet swirls at a speed being decompression-boiled and being a gas-liquid two phase refrigerant, wherein
the refrigerant inlet introduces the refrigerant tangentially to an inner circular surface of the swirl space to promote the swirling of the refrigerant flowing from the refrigerant inlet,
the refrigerant outlet has a throttle in which a refrigerant passage area is decreased to decompress the refrigerant, and the gas-liquid two phase refrigerant flows through the throttle of the refrigerant outlet,
the swirl space causes the refrigerant to swirl at a swirl speed such that a greater amount of gas-phase refrigerant is distributed to a radial inside of the swirl space than to a radial outside of the swirl space relative to a swirl center line when the swirl center line in the swirl space is defined as a line connecting center points of swirling of the refrigerant,
the refrigerant outlet is positioned on an extension line of the swirl center line,
the refrigerant inlet and the refrigerant outlet are configured to have $1<Ain/Aout<12$, when a passage cross-sectional area of the refrigerant inlet is designated as Ain and a passage cross-sectional area of the refrigerant outlet is designated as Aout,
the refrigeration cycle device has an evaporator, and
the refrigerant outlet is directly connected to the evaporator via a refrigerant conduit.

* * * * *